United States Patent
Ding et al.

(10) Patent No.: US 10,740,328 B2
(45) Date of Patent: Aug. 11, 2020

(54) AGGREGATE-QUERY DATABASE SYSTEM AND PROCESSING

(71) Applicant: Microsoft Technology Licensing, LLC, Redmond, WA (US)

(72) Inventors: Bolin Ding, Redmond, WA (US); Silu Huang, Urbana, IL (US); Chi Wang, Redmond, WA (US); Kaushik Chakrabarti, Bellevue, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 369 days.

(21) Appl. No.: 15/192,909

(22) Filed: Jun. 24, 2016

(65) Prior Publication Data

US 2017/0371924 A1    Dec. 28, 2017

(51) Int. Cl.
*G06F 16/2453*    (2019.01)
*G06F 16/22*    (2019.01)
(Continued)

(52) U.S. Cl.
CPC ...... *G06F 16/2453* (2019.01); *G06F 16/2228* (2019.01); *G06F 16/2455* (2019.01); *G06F 16/2462* (2019.01)

(58) Field of Classification Search
CPC ......... G06F 17/30442; G06F 17/30321; G06F 17/30477; G06F 17/30536; G06F 16/2453;

(Continued)

(56) References Cited

U.S. PATENT DOCUMENTS

| 5,878,426 A | 3/1999 | Plasek et al. |
| 6,052,689 A | 4/2000 | Muthukrishnan et al. |

(Continued)

FOREIGN PATENT DOCUMENTS

| CN | 101551745 A | 10/2009 |
| WO | 2014011708 A2 | 1/2014 |

(Continued)

OTHER PUBLICATIONS

Acharya, et al., "Congressional samples for approximate answering of group-by queries", In Proceedings of the ACM SIGMOD international conference on Management of data, May 16, 2000, pp. 487-498.

(Continued)

*Primary Examiner* — Matthew J Ellis

(57) ABSTRACT

A processing unit can determine a first subset of a data set including data records selected based on measure values thereof. The processing unit can determine an index mapping a predicate to data records associated with that predicate and approximation values of the records. The processing unit can process a query against the first subset to provide a first result and a first accuracy value, determine that the first accuracy value does not satisfy an accuracy criterion, and process the query against the index. In some examples, the processing unit can process the query against a second subset including data records satisfying a predetermined predicate. In some examples, the processing unit can receive data records and determine the first subset. Data records can include respective measure values. Data records with higher measure values can occur in the first subset more frequently than data records with lower measure values.

19 Claims, 12 Drawing Sheets

(51) Int. Cl.
   *G06F 16/2455* (2019.01)
   *G06F 16/2458* (2019.01)
(58) Field of Classification Search
   CPC .............. G06F 16/2228; G06F 16/2488; G06F 16/2462
   See application file for complete search history.

(56) References Cited

U.S. PATENT DOCUMENTS

| | | | |
|---|---|---|---|
| 6,108,658 A | 8/2000 | Lindsay et al. | |
| 6,477,534 B1 | 11/2002 | Acharya et al. | |
| 6,504,195 B2 | 1/2003 | Guidash | |
| 6,760,724 B1 | 7/2004 | Chakrabarti et al. | |
| 6,842,753 B2 | 1/2005 | Chaudhuri et al. | |
| 7,182,465 B2 | 2/2007 | Fuchs et al. | |
| 7,385,708 B2 | 6/2008 | Ackerman et al. | |
| 7,536,396 B2 | 5/2009 | Johnson et al. | |
| 7,567,949 B2 | 7/2009 | Chaudhuri et al. | |
| 7,636,707 B2 | 12/2009 | Chaudhuri et al. | |
| 7,650,331 B1 | 1/2010 | Dean et al. | |
| 7,716,215 B2 | 5/2010 | Lohman et al. | |
| 7,728,868 B2 | 6/2010 | Razzaque et al. | |
| 7,877,381 B2 | 1/2011 | Ewen et al. | |
| 7,882,138 B1 | 2/2011 | Kumar | |
| 7,890,444 B2 | 2/2011 | Torres et al. | |
| 8,032,554 B2 | 10/2011 | Nishizawa et al. | |
| 8,090,730 B2 | 1/2012 | Shahabi et al. | |
| 8,484,243 B2 | 7/2013 | Krishnamurthy et al. | |
| 8,553,034 B2 | 10/2013 | Wong et al. | |
| 8,572,068 B2 | 10/2013 | Graefe et al. | |
| 8,959,651 B2 | 2/2015 | Li et al. | |
| 8,983,936 B2 | 3/2015 | Fisher et al. | |
| 9,047,225 B1* | 6/2015 | Evans | G06F 12/121 |
| 9,436,740 B2 | 9/2016 | Fisher et al. | |
| 9,607,045 B2 | 3/2017 | Fisher et al. | |
| 9,881,053 B2* | 1/2018 | Stoica-Beck | G06F 16/242 |
| 2004/0002956 A1 | 1/2004 | Chaudhuri et al. | |
| 2004/0249810 A1 | 12/2004 | Das et al. | |
| 2005/0182558 A1* | 8/2005 | Maruta | G01C 21/30 |
| | | | 701/532 |
| 2006/0031209 A1 | 2/2006 | Ahlberg et al. | |
| 2006/0074882 A1 | 4/2006 | Scherer et al. | |
| 2006/0106793 A1 | 5/2006 | Liang | |
| 2007/0016612 A1 | 1/2007 | James et al. | |
| 2007/0226178 A1 | 9/2007 | Ewen et al. | |
| 2008/0072180 A1 | 3/2008 | Chevalier et al. | |
| 2008/0077530 A1 | 3/2008 | Banas et al. | |
| 2008/0250357 A1 | 10/2008 | Lee et al. | |
| 2008/0306919 A1 | 12/2008 | Iwayama et al. | |
| 2009/0187467 A1 | 7/2009 | Fang et al. | |
| 2009/0228434 A1 | 9/2009 | Krishnamurthy et al. | |
| 2009/0252404 A1 | 10/2009 | Lecerf | |
| 2009/0271529 A1 | 10/2009 | Kashiyama et al. | |
| 2009/0322754 A1 | 12/2009 | Robertson et al. | |
| 2009/0322756 A1 | 12/2009 | Robertson et al. | |
| 2010/0225661 A1 | 9/2010 | Gorisch et al. | |
| 2010/0241646 A1 | 9/2010 | Friedman et al. | |
| 2010/0268067 A1 | 10/2010 | Razzaque et al. | |
| 2011/0047120 A1 | 2/2011 | Kamvar et al. | |
| 2011/0084967 A1 | 4/2011 | De pauw et al. | |
| 2011/0167110 A1 | 7/2011 | Hoffberg et al. | |
| 2011/0258183 A1 | 10/2011 | Gibbs et al. | |
| 2011/0302164 A1 | 12/2011 | Krishnamurthy et al. | |
| 2011/0310112 A1 | 12/2011 | Zolotovitski | |
| 2011/0314021 A1 | 12/2011 | Gibbs et al. | |
| 2012/0047125 A1 | 2/2012 | Day et al. | |
| 2012/0047128 A1* | 2/2012 | Shepherd | G06F 17/30707 |
| | | | 707/723 |
| 2012/0054173 A1 | 3/2012 | Andrade et al. | |
| 2012/0078904 A1* | 3/2012 | Agrawal | G06F 17/30321 |
| | | | 707/737 |
| 2012/0078939 A1 | 3/2012 | Chen et al. | |
| 2012/0089642 A1 | 4/2012 | Milward et al. | |
| 2012/0158708 A1 | 6/2012 | Gillet et al. | |
| 2012/0246102 A1* | 9/2012 | Sudharsan | G06N 7/005 |
| | | | 706/25 |
| 2012/0311581 A1 | 12/2012 | Balmin et al. | |
| 2013/0030860 A1 | 1/2013 | Chaubey et al. | |
| 2013/0046756 A1 | 2/2013 | Hao et al. | |
| 2013/0117257 A1 | 5/2013 | Meijer et al. | |
| 2013/0124097 A1 | 5/2013 | Thorne | |
| 2013/0179466 A1 | 7/2013 | Mizobuchi et al. | |
| 2013/0194271 A1 | 8/2013 | Roesch et al. | |
| 2013/0268520 A1 | 10/2013 | Fisher et al. | |
| 2014/0019352 A1* | 1/2014 | Shrivastava | G06Q 20/3674 |
| | | | 705/41 |
| 2014/0082178 A1 | 3/2014 | Boldyrev et al. | |
| 2014/0095525 A1 | 4/2014 | Hsiao et al. | |
| 2014/0164348 A1 | 6/2014 | Reed | |
| 2014/0195558 A1 | 7/2014 | Murthy et al. | |
| 2014/0222826 A1* | 8/2014 | DaCosta | G06F 17/30321 |
| | | | 707/741 |
| 2014/0372438 A1 | 12/2014 | Chandramouli et al. | |
| 2015/0269228 A1 | 9/2015 | Fisher et al. | |
| 2017/0154098 A1 | 6/2017 | Fisher et al. | |
| 2017/0228425 A1 | 8/2017 | Kandula et al. | |
| 2017/0262635 A1* | 9/2017 | Strauss | G06F 21/577 |

FOREIGN PATENT DOCUMENTS

| | | |
|---|---|---|
| WO | 2014200877 A1 | 12/2014 |
| WO | 2015138497 A2 | 9/2015 |

OTHER PUBLICATIONS

Acharya, et al., "Fast and Near-Optimal Algorithms for Approximating Distributions by Histograms", In Proceedings of the 34th ACM Symposium on Principles of Database Systems, May 31, 2015, pp. 249-263.

Acharya, et al., "Join synopses for approximate query answering", In Proceedings of the ACM SIGMOD international conference on Management of data, Jun. 1999, pp. 275-286.

Acharya, et al., "The aqua approximate query answering system", In Proceedings of the ACM SIGMOD International Conference on Management, Jun. 1, 1999, pp. 574-576.

Agarwal, et al., "Automated selection of materialized views and indexes in SQL databases", In Proceedings of the 26th International Conference on Very Large Data Bases, Sep. 10, 2000, pp. 496-505.

Agarwal, et al., "BlinkDB: queries with bounded errors and bounded response times on very large data", In Proceedings of the 8th ACM European Conference on Computer Systems, Apr. 15, 2013, pp. 29-42.

Agarwal, et al., "Knowing when you're wrong: building fast and reliable approximate query processing systems", In Proceedings of the ACM SIGMOD International Conference on Management of Data, Jun. 22, 2014, pp. 481-492.

Babcock, et al., "Dynamic sample selection for approximate query processing", I Proceedings of the ACM SIGMOD International Conference on Management of Data, Jun. 9, 2003, pp. 539-550.

Bille, et al., "Fast evaluation of union-intersection expressions", In Proceedings of 18th International Symposium on Algorithms and Computation, Dec. 17, 2007, pp. 1-16.

Chakrabarti, et al., "Approximate query processing using wavelets", In International Journal on Very Large Data Bases, vol. 10, Iss. 2-3, Sep. 2001, pp. 199-223.

Charikar, et al., "Towards estimation error guarantees for distinct values", In Proceedings of the nineteenth ACM SIGMOD-SIGACT-SIGART symposium on Principles of database systems, May 1, 2000, pp. 268-279.

Chaudiauri, et al., "A robust, optimization-based approach for approximate answering of aggregate queries", In Proceedings of the ACM SIGMOD international conference on Management of data, May 21, 2001, pp. 295-306.

Chaudiauri, et al., "Optimized stratified sampling for approximate query processing", In Journal of ACM Transactions on Database Systems, vol. 32, Iss. 2, Jun. 2007, 50 pages.

(56) References Cited

OTHER PUBLICATIONS

Chaudiauri, et al., "Overcoming limitations of sampling for aggregation queries", In Proceedings of 17th International Conference on Data Engineering, Apr. 2, 2001, pp. 534-542.
Condie, et al., "MapReduce online", In Proceedings of the 7th USENIX conference on Networked systems design and implementation, Apr. 28, 2010, 15 pages.
Dobra, et al., "Processing complex aggregate queries over data streams", In Proceedings of the ACM SIGMOD International conference on Management of data, Jun. 4, 2002, pp. 61-72.
Ganti, et al., "Icicles: Self-tuning samples for approximate query answering", In Proceedings of the 26th International Conference on Very Large Data Bases, Sep. 10, 2000, pp. 176-187.
Garofalakis, et al., "Approximate query processing: Taming the terabytes", In Proceedings of 27th International Conference on Very Large Data Bases, Sep. 11, 2001, pp. 171-212.
Gilbert, et al., "Optimal and approximate computation of summary statistics for range aggregates", In Proceedings of the Twentieth ACM SIGMOD-SIGACT-SIGART Symposium on Principles of Database Systems, May 21, 2001, pp. 227-236.
Gray, et al., "Data Cube: A Relational aggregation operator generalizing group-by, cross-tab, and sub-totals", In Journal of Data Mining and Knowledge Discovery, vol. 1, Iss. 1, Mar. 1997, pp. 29-53.
Hellerstein, et al., "Online aggregation", In Proceedings ACM SIGMOD International Conference on Management of Data, May 13, 1997, pp. 171-182.
Inoue, Tomohiro, "An Effective Technique and Practical Utility for Approximate Query Processing", In Master Thesis of Curtin University, Nov. 2015, 95 pages.
Khurana, et al., "A Framework for Fast Approximate Query Processing on Temporal Data", In Proceedings of the 3rd International Workshop on Big Data, Streams and Heterogeneous Source Mining, Aug. 24, 2014, pp. 29-45.
Kim, et al., "Rapid sampling for visualizations with ordering guarantees", In Proceedings of the VLDB Endowment, vol. 8, Issue 5, Aug. 31, 2015, pp. 521-532.
Kleiner, et al., "A general bootstrap performance diagnostic", In Proceedings of the 19th ACM SIGKDD international conference on Knowledge discovery and data mining, Aug. 11, 2013, 9 pages.
Koudas, et al., "Approximate NN queries on streams with guaranteed error/performance bounds", In Proceedings of be Thirtieth international conference on Very large data bases, vol. 30, Aug. 31, 2004, pp. 804-815.
Liu, "Approximate Query Processing", In Publication of Springer, Nov. 21, 2009, 9 pages.
Olston, et al., "Interactive Analysis of Web-Scale Data", In Proceedings of 4th Biennial Conference on Innovative Data Systems Research, Jan. 4, 2009, 7 pages.
Pansare, et al., "Online Aggregation for Large Mapreduce Jobs", In Proceedings of the VLDB Endowment, vol. 4, Iss. 11, Aug. 29, 2011, pp. 1135-1145.
Potti, et al., "DAQ: a new paradigm for approximate query processing", In Proceedings of the VLDB Endowment, vol. 8, Iss. 9, Aug. 31, 2015, pp. 898-909.
Shneiderman, "Response time and display rate in human performance with computers", In Journal of ACM Computing Surveys, vol. 16, Iss. 3, Sep. 1984, pp. 265-285.
Sidirourgos, et al., "Sciborq: Scientific data management with bounds on runtime and quality", In Proceedings of 5th Biennial Conference on Innovative Data Systems Research, Jan. 9, 2011, pp. 296-301.
Vitter, et al., "Approximate computation of multidimensional aggregates of sparse data using wavelets", In Proceedings of ACM SIGMOD international conference on Management of data, Jun. 1, 1999, pp. 193-204.
Wang, et al., "A sample-and-clean framework for fast and accurate query processing on dirty data", In Proceedings of the ACM SIGMOD International Conference on Management of Data, Jun. 22, 2014, pp. 469-480.

Yarygina, et al., "Optimizing resource allocation for approximate real-time query processing", In Proceedings of Computer Science and Information Systems, vol. 11, Iss. 1, Jan. 2014, pp. 69-88.
Zeng, et al., "The analytical bootstrap: a new method for fast error estimation in approximate query processing", In Proceedings of ACM SIGMOD International Conference on Management of Data, Jun. 22, 2014, pp. 277-288.
"Response Filed to Office Action of European Patent Application No. 13740442.2", dated Jul. 14, 2017, 15 Pages.
"Final Office Action Issued in U.S. Appl. No. 15/432,270", dated Nov. 17, 2017, 16 Pages.
"Non Final Office Action Issued in U.S. Appl. No. 15/432,270", dated Mar. 30, 2018, 8 Pages.
"Non final Office Action Issued in U.S. Appl. No. 15/432,270", dated Sep. 5, 2017, 12 Pages.
"Office Action and Search Report Issued in Chinese Patent Application No. 201380037221.X", dated Feb. 17, 2017, 13 Pages.
"Second Office Action Issued in Chinese Patent Application No. 201380037221.X", dated Oct. 27, 2017, 10 Pages.
"Third Office Action Issued in Chinese Patent Application No. 201380037221.X", dated Mar. 9, 2018, 7 Pages.
"Voluntary Amendment Issued in Chinese Patent Application No. 201380037221.X", dated Jul. 1, 2015, 7 Pages.
"Voluntary Amendment filed in Chinese Patent Application No. 201480033884.9", dated Jul. 28, 2016, 14 Pages.
"Response filed to the First Office Action of Chinese Patent Application No. 21380037221.X", dated Jun. 23, 2017, 12 Pages.
Abadi, et al., "The Design of the Borealis Stream Processing Engine", In Proceedings of the Second Biennial Conference on Innovative Data Systems Research, Jan. 2005, 13 Pages.
Ali, et al., "Microsoft CEP Server and Online Behavioral Targeting", In Proceedings of the VLDB Endowment, vol. 2, Issue 2, Aug. 24, 2009, 4 Pages.
Babcock, et al., "Models and Issues in Data Stream Systems", In Proceedings of the Twenty-first ACM SIGMOD-SIGACT-SIGART on Principles of Database Systems, Jun. 3, 2002, 16 Pages.
Bain, William, "Using In-Memory Computing to Simplify Big Data Analytics", Retrieved From: https://www.scaleoutsoftware.com/wp-content/uploads/2015/03/Simplifying_Data_Analysis_ScaleOut_WP.pdf, Retrieved Date: Feb. 20, 2013, 5 Pages.
Balazinska, et al., "Fault-Tolerance in the Borealis Distributed Stream Processing System", In the International Conference on Management of Data, Jun. 14, 2005, 12 Pages.
Barga, et al., "Consistent Streaming Through Time: A Vision for Event Stream Processing", In the third Biennial Conference on Innovative Data Systems Research, Jan. 10, 2007, 12 Pages.
Barga, et al., "Daytona: Iterative MapReduce on Windows Azure", Retrieved From: https://web.archive.org/web/20151213132253/http://research.microsoft.com/en-us/projects/daytona/, Retrieved Date: Sep. 19, 2013,4 Pages.
Barga, et al., "Iterative MapReduce Research on Azure", In Proceedings of the International Conference for High Performance Computing, Networking, Storage and Analysis, Nov. 12, 2011, 1 Page.
Barnett, et al., "Stat!—An Interactive Analytics Environment for Big Data", In Proceedings of the ACM SIGMOD International Conference on Management of Data, Jun. 22, 2013, 4 Pages.
Baudisch, et al., "Phosphor: Explaining Transitions in the User Interface Using Afterglow Effects", In Proceedings of the 19th Annual ACM Symposium on User Interface Software and Technology, Oct. 15, 2006, pp. 169-178.
Bose, et al., "Beyond Online Aggregation: Parallel and Incremental Data Mining with Online Map-Reduce", In Proceedings of the ACM Workshop on Massive Data Analytics on the Cloud, Apr. 26, 2010, 6 Pages.
Bostock, et al., "D3: Data-Driven Documents", In Proceedings of the IEEE Transactions on Visualization and Computer Graphics, vol. 17, Issue 12, Dec. 2011, 9 Pages.
Budiu, et al., "Interacting with Large Distributed Datasets using Sketch", In Proceedings of Eurographics Symposium on Parallel Graphics and Visualization, May 25, 2015, 13 Pages.

(56) References Cited

OTHER PUBLICATIONS

Card, et al., "The Information Visualizer, an Information Workspace", In Proceedings of the ACM SIGCHI Conference on Human Factors in Computing Systems, Apr. 27, 1991, 8 Pages.

Chaiken, et al., "SCOPE: Easy and Efficient Parallel Processing of Massive Data Sets", In Proceedings of Very Large Data Bases Endowment, vol. 1, Issue 2, Aug. 24, 2008, pp. 1-12.

Chan, et al., "Maintaining Interactivity While Exploring Massive Time Series", In Proceedings of IEEE Symposium on Visual Analytics Science and Technology, Oct. 19, 2008, 8 Pages.

Chandramouli, et al., "Scalable Progressive Analytics on Big Data in the Cloud", In Proceedings of the Very Large Data Bases Endowment, vol. 6, Issue 14, Sep. 2013, pp. 1726-1737.

Chandramouli, et al., "Temporal Analytics on Big Data for Web Advertising", In the 28th International Conference on Data Engineering, Apr. 5, 2012, pp. 90-101.

Chang, et al., "Bigtable: A Distributed Storage System for Structured Data", In the 7th Conference on USENIX Symposium on Operating Systems Design and Implementation, vol. 7, Nov. 6, 2006, 14 Pages.

Chaudhuri, et al., "An Overview of Data Warehousing and OLAP Technology", In Proceedings of the ACM SIGMOD Record, vol. 26, Issue 1, Mar. 1, 1997, 10 Pages.

Chaudhuri, et al., "Effective Use of Block-Level Sampling in Statistics Estimation", In International Conference on Management of Data, Jun. 13, 2004, 12 Pages.

Chaudhuri, et al., "On Random Sampling over Joins", In Proceedings of the ACM SIGMOD International Conference on Management of Data, May 31, 1999, 12 Pages.

Chen, et al., "Large-Scale Behavioral Targeting", In Proceedings of the 15th ACM SIGKDD International Conference on Knowledge Discovery and Data Mining, Jun. 28, 2009, 9 Pages.

Codd, Edgar F., "A Relational Model of Data for Large Shared Data Banks", In Proceedings of the Communications of the ACM, vol. 13, Issue 6, Jun. 1970, pp. 377-387.

Cohn, et al., "Improving Generalization with Active Learning", In Proceedings of the Machine Learning, vol. 15, Issue 2, May 1994, 21 Pages.

Correa, et al., "A Framework for Uncertainty-Aware Visual Analytics", In Proceedings of the IEEE Symposium on Visual Analytics Science and Technology, Oct. 12, 2009, pp. 51-58.

Cottam, et al., "Bit by Bit: Incremental Data Visualization", In Proceedings of the IEEE Symposium on Information Visualization, Oct. 19, 2008, 2 Pages.

Cumming, et al., "Inference by Eye: Confidence Intervals and How to Read Pictures of Data", In Journal of American Psychologist, vol. 60, No. 2, Feb. 2005, pp. 170-180.

Das, et al., "Google News Personalization: Scalable Online Collaborative Filtering", In Proceedings of the 16th ACM International Conference on World Wide Web, May 8, 2007, 10 Pages.

Dean, et al., "Mapreduce: Simplified Data Processing on Large Clusters", In Proceedings of the USENIX Association 6th Symposium on Operating Systems Design and Implementation, Dec. 6, 2004, pp. 137-149.

Deligiannidis, et al., "User-Centered Incremental Data Exploration and Visualization", In Proceedings of the Technical Report, LSDIS Lab and Computer Science, The University of Georgia, 2006, 10 Pages.

Diao, Yanlei, "Scalable, Low-Latency Data Analytics and its Applications", Retrieved From: http://www.comp.hkbu.edu.hk/v1/file/seminar/20120117_Diao-2012public.pdf, Retrieved Date: Feb. 20, 2013, 29 Pages.

Zuk et al., "Visualization of Uncertainty and Reasoning", In Proceedings of the 8th International Symposium on Smart Graphics, 2007, 14 Pages.

Ding, et al., "Sample+ Seek: Approximating Aggregates with Distribution Precision Guarantee", In Proceedings of the International Conference on Management of Data, Jun. 26, 2016, pp. 679-694.

Doucet, et al., "Efficient Block Sampling Strategies for Sequential Monte Carlo Methods", In Journal of Computational and Graphical Statistics, vol. 15, Issue 3, Sep. 2006, 19 Pages.

Elmqvist, et al., "Hierarchical Aggregation for Information Visualization: Overview, Techniques, and Design Guidelines", In Proceedings of the IEEE Transactions on Visualization and Computer Graphics, vol. 16, Issue 3, May 2010, 14 Pages.

Esty, et al., "The Box-Percentile Plot", In Journal of Statistical Software, vol. 8, Issue 17, 2003, pp. 1-14.

Fekete, et al., "Progressive Analytics: A Computation Paradigm for Exploratory Data Analysis", In Proceedings of Computer Research Repository, Jul. 2016, 10 Pages.

Ferreira, et al., "Sample-Oriented Task-Driven Visualizations: Allowing Users to Make Better, More Confident Decisions", In Proceedings of the SIGCHI Conference on Human Factors in Computing Systems, Apr. 26, 2014, pp. 571-580.

Fisher, Danyel, "Big Data Exploration Requires Collaboration between Visualization and Data Infrastructures", In Proceedings of the Workshop on Human-In-the-Loop Data Analytics, Jun. 26, 2016, 5 Pages.

"Airline Delays, Cancellations and Tarmac Times", Retrieved From https://web.archive.org/web/20140130232112/http://www.rita.dot.gov/bts/data_and_statistics/by_mode/airline_and_airports/airline_delay.html, Dec. 15, 2016, 2 Pages.

"Airline On-Time Performance and Causes of Flight Delays", Retrieved From https://web.archive.org/web/20120109030043/http://explore.data.gov/Transportation/Airline-On-Time-Performance-and-Causes-of-Flight-D/ar4r-an9z, Retrieved Date: Apr. 4, 2012, 1 Page.

"Database SQL Tuning Guide", Retrieved From https://docs.oracle.com/database/121/TGSQL/tgsql_histo.htm#TGSQL366, Dec. 16, 2016, 22 Pages.

"Hadoop", Retrieved From http://hadoop.apache.org/, Retrieved Date: Aug. 17, 2015, 3 Pages.

"LINQ (Language-Integrated Query)", In Proceedings of the LINQ Project, Visual Studio, 2010, 26 Pages.

"LINQ (Language-Integrated Query)", Retrieved From https://web.archive.org/web/20160221212347/https://msdn.microsoft.com/library/bb397926.aspx, Retrieved Date: Feb. 22, 2013, 1 Page.

"Open Directory Project", Retrieved From https://web.archive.org/web/*/http://dmoz.org, Retrieved Date: Dec. 18, 2012, 1 Page.

"Process Progress Dialog Box (Analysis Services—Multidimensional Data)", Retrieved From: https://technet.microsoft.com/en-us/library/ms190131(v=sql.110).aspx, Retrieved Date: Feb. 20, 2013, 2 Pages.

"StreamInsight", Retrieved From: http://www.microsoft.com/sqlserver/en/us/solutions-technologies/business-Intelligence.com, Aug. 30, 2012, 2 Pages.

"Uncertainty Visualization", Retrieved From: http://spatialanalyst.net/wiki/index.php?title=Uncertainty_visualization, Retrieved Date: Jan. 11, 2012, 11 Pages.

"Final Office Action Issued in U.S. Appl. No. 13/439,563", dated Nov. 1, 2013, 8 Pages.

"Non-Final Office Action Issued in U.S. Appl. No. 13/439,563", dated May 9, 2014, 10 Pages.

"Non-Final Office Action Issued in U.S. Appl. No. 13/439,563", dated May 14, 2013, 7 Pages.

"Notice of Allowance Issued in U.S. Appl. No. 13/439,563", dated Oct. 28, 2014, 9 Pages.

"RCE and Amendment Filed in U.S. Appl. No. 13/439,563", filed Feb. 3, 2014, 13 Pages.

"Response to Non-Final Office Action Filed in U.S. Appl. No. 13/439,563", filed Sep. 12, 2013, 9 Pages.

"Response to Non-Final Office Action Filed in U.S. Appl. No. 13/439,563", filed Aug. 11, 2014, 9 Pages.

"Advisory Action Issued in U.S. Appl. No. 13/439,650", dated Jun. 10, 2016, 3 Pages.

"Final Office Action Issued in U.S. Appl. No. 13/439,650", dated Feb. 12, 2016, 6 Pages.

"Non-Final Office Action Issued in U.S. Appl. No. 13/439,650", dated Jun. 16, 2014, 33 Pages.

"Non-Final Office Action Issued in U.S. Appl. No. 13/439,650", dated May 21, 2015, 5 Pages.

(56) References Cited

OTHER PUBLICATIONS

"Notice of Allowance Issued in U.S. Appl. No. 13/439,650", dated Jul. 29, 2016, 14 Pages.
"Notice of Allowance issued in U.S. Appl. No. 13/439,650", dated Jan. 20, 2015, 9 Pages.
"Notice of Appeal and Pre-Appeal Brief Request Issued in U.S. Appl. No. 13/439,650", filed Jun. 30, 2016, 9 Pages.
"Notice of Panel Decision from Pre-Appeal Brief Review Issued in U.S. Appl. No. 13/439,650", dated Jul. 13, 2016, 2 Pages.
"Response to Final Office Action Filed in U.S. Appl. No. 13/439,650", filed May 3, 2016, 11 Pages.
"Response to Non-Final Office Action Filed in U.S. Appl. No. 13/439,650", filed Nov. 4, 2015, 14 Pages.
"Response to Non-Final Office Action Filed in U.S. Appl. No. 13/439,650", filed Sep. 16, 2014, 19 Pages.
"Applicant-Initiated Interview Summary from U.S. Appl. No. 13/723,224", dated Nov. 15, 2016, 4 pages
"Applicant-Initiated Interview Summary from U.S. Appl. No. 13/723,224", dated Apr. 25, 2016, 3 Pages.
"Final Office Action Issued in U.S. Appl. No. 13/723,224", dated Sep. 16, 2016, 11 Pages.
"Final Office Action Issued in U.S. Appl. No. 13/723,224", dated Feb. 24, 2016, 17 Pages.
"Non-Final Office Action Issued in U.S. Appl. No. 13/723,224", dated May 23, 2016, 11 Pages.
"Non-Final Office Action Issued in U.S. Appl. No. 13/723,224", dated Oct. 14, 2015, 10 Pages.
"Non-Final Office Action Issued in U.S. Appl. No. 13/723,224", dated Jul. 9, 2015, 9 Pages.
"Notice of Allowance Issued in U.S. Appl. No. 13/723,224", dated Nov. 23, 2016, 7 Pages.
"Response to the Final Office Action from U.S. Appl. No. 13/723,224", dated Apr. 29, 2016, 9 Pages.
"Response to the Final Office Action from U.S. Appl. No. 13/723,224", dated Nov. 10, 2016, 10 Pages.
"Response to the Non-Final Office Action from U.S. Appl. No. 13/723,224", dated Aug. 16, 2016, 10 Pages.
"Response to the Non-Final Office Action from U.S. Appl. No. 13/723,224", filed Sep. 21, 2015, 8 Pages.
"Response to the Non-Final Office Action from U.S. Appl. No. 13/723,224", dated Jan. 6, 2016, 11 Pages.
"Amendment and Response to Non-Final Office Action Filed in U.S. Appl. No. 13/915,632", dated Jun. 12, 2015, 14 Pages.
"Amendment and Response to Notice to File Corrected Application Papers Filed in U.S. Appl. No. 13/915,632", filed Sep. 3, 2013, 95 Pages.
"Final Office Action Issued in U.S. Appl. No. 13/915,632", dated Aug. 6, 2015, 11 Pages.
"Non-Final Office Action Issued in U.S. Appl. No. 13/915,632", dated Mar. 12, 2015, 10 Pages.
"Notice of Allowance Issued in U.S. Appl. No. 13/915,632", dated Apr. 13, 2016, 9 Pages.
"Notice of Allowance Issued in U.S. Appl. No. 13/915,632", dated Aug. 22, 2016, 10 Pages.
"Response to Final Office Action Filed in U.S. Appl. No. 13/915,632", filed Feb. 3, 2016, 23 Pages.
"Office Action Issued in European Patent Application No. 13740442.2", dated May 29, 2017, 9 Pages.
"Oral Hearing Issued in European Patent Application No. 13740442.2", dated Apr. 26, 2018, 8 Pages.
Stasko, et al., "Jigsaw: Supporting Investigative Analysis Through Interactive Visualization", In Journal of Information Visualization, vol. 7, Issue 2, 2008, pp. 118-132.
Stolper, et al., "Progressive Visual Analytics: User-Driven Visual Exploration of In-Progress Analytics", In Journal of IEEE Transactions on Visualization and Computer Graphics, vol. 20, Issue 12, Dec. 31, 2014, 10 Pages.
Stolte, et al., "Polaris: aA System for Query, Analysis, and Visualization of Multidimensional Relational Databases", In Proceedings of IEEE Transactions on Visualization and Computer Graphics, vol. 8, No. 1, Jan. 2002, 10 Pages.
Stonebraker, et al., "C-store: A Column-Oriented DBMS", In Proceedings of the 31st International Conference on Very Large Data Bases, Aug. 30, 2005, 12 Pages.
Streit, et al., "A Spreadsheet Approach to Facilitate Visualization of Uncertainty in Information", In Proceedings of the IEEE Transactions on Visualization and Computer Graphics, vol. 14, Issue 1, Jan. 2008, pp. 61-72.
Su, et al., "Approximate Aggregates in Oracle 12C", In the International Conference on Information and Knowledge Management, Oct. 24, 2016, pp. 1603-1612.
Thomson, et al., "A Typology for Visualizing Uncertainty", In the Conference on Electronic Imaging, Visualization and Data Analysis, vol. 5569, Jan. 16, 2005, 12 Pages.
Tucker, et al., "Exploiting Punctuation Semantics in Continuous Data Streams", In Proceedings of the IEEE Transactions on Knowledge and Data Engineering, vol. 15, Issue 3, May 13, 2003, pp. 555-568.
Tukey, John W., "Exploratory data analysis", In Publication of Pearson, Jan. 1977, pp. 5-23.
Upadhyaya, et al., "A Latency and Fault-Tolerance Optimizer for Online Parallel Query Plans", In Proceedings of the ACM SIGMOD International Conference on Management of Data, Jun. 12, 2011, 12 Pages.
Viegas, et al., "Participatory Visualization with Wordle", In Proceedings of the IEEE Transactions on Visualization and Computer Graphics, vol. 15, Issue 6, Nov. 2009, 8 Pages.
Viglas, et al., "Rate-Based Query Optimization for Streaming Information Sources", In Proceedings of the ACM SIGMOD International Conference on Management of Data, Jun. 3, 2002, 13 Pages.
Vvongsuphasawat, et al., "Voyager: Exploratory Analysis via Faceted Browsing of Visualization Recommendations", In Journal of IEEE Transactions on Visualization and Computer Graphics, vol. 22, Issue 1, Jan. 2016, 10 Pages.
White, Tom, "Hadoop: The Definitive Guide", In Proceedings of the O'Reilly Media/ Yahoo Press, May 7, 2012, 525 Pages.
Wickham, et al., "40 Years of Boxplots", Retrieved From: http://vita.had.co.nz/papers/boxplots.pdf, Nov. 29, 2011, 17 Pages.
Wickham, Hadley, "Bin-Summarise-Smooth: A Framework for Visualising Large Data", In Technical Report of Clarkson University, Oct. 13, 2013, 9 Pages.
Wittenbrink, et al., "Glyphs for Visualizing Uncertainty in Vector Fields", In Proceedings of the IEEE Transactions on Visualization and Computer Graphics, vol. 2, Issue 3, Sep. 1996, 14 Pages.
Yan, et al., "How much can Behavioral Targeting Help Online Advertising?", In Proceedings of the 18th International Conference on World Wide Web, Apr. 20, 2009, 10 Pages.
Yi, et al., "Understanding and Characterizing Insights: How Do People Gain Insights Using Information Visualization?", In Proceedings of the Workshop on Beyond Time and Errors: Novel Evaluation Methods for Information Visualization, Apr. 5, 2008, 6 Pages.
Yu, et al., "DryadLINQ: A System for General-Purpose Distributed Data-Parallel Computing Using a High-Level Language", In Proceedings of the 8th USENIX Conference on Operating Systems Design and Implementation, vol. 3, Dec. 8, 2008, 14 Pages.
Zaharia, et al., "Discretized Streams: An Efficient and Fault-Tolerant Model for Stream Processing on Large Clusters", In Proceedings of the HotCloud, vol. 12, 2012, 6 Pages.
1AHARIA, et al., "Resilient Distributed Datasets: a Fault-Tolerant Abstraction for In-Memory Cluster Computing", in Proceedings of the 9th Usenix Conference on Networked Systems Design and Implementation, Apr. 25, 2012, 14 pp.
Zeng, et al., "ABS: A System for Scalable Approximate Queries with Accuracy Guarantees", In Proceedings of ACM SIGMOD International Conference on Management of Data, Jun. 22, 2014, pp. 1067-1070.
Zhang, Donghui, "Advanced Database Aggregation Query Processing", In Proceedings of EDBT PhD Workshop, 4 Pages.

(56) References Cited

OTHER PUBLICATIONS

Rijsbergen, Van, et al., "New models in probabilistic information retrieval", London: British Library Research and Development Department, 1980, 123 Pages.
Liu, et al., "The effects of Interactive Latency on Exploratory Visual Analysis", In IEEE transactions on Visualization and Computer Graphics, vol. 20, Issue 12, Dec. 2014, 10 Pages.
LL, et al., "A Platform for Scalable One-Pass Analytics Using MapReduce", In Proceedings of the ACM SIGMOD International Conference on Management of Data, Jun. 12, 2011, 12 Pages.
Loboz, et al., "DataGarage: Warehousing Massive Performance Data on Commodity Servers", In Proceedings of the VLDB Endowment, vol. 3, Issue 2, 2010, 12 Pages.
Logothetis, et al., "Stateful Bulk Processing for Incremental Analytics", In Proceedings of the 1st ACM Symposium on Cloud Computing, Jun. 10, 2010, 12 Pages.
Luo, et al., "A Scalable Hash Ripple Join Algorithm", In Proceedings of the ACM SIGMOD International Conference on Management of Data, Jun. 4, 2002, 11 Pages.
Luo, et al., "Query Merging for Data Processing in the Cloud", Retrieved From: http://www.cs.duke.edu/-fanyang/file/296_final_report.pdf, Retrieved Date: Feb. 20, 2013, 5 Pages.
Maron, et al., "Hoeffding Races: Accelerating Model Selection Search for Classification and Function Approximation", In Proceedings of the Advances in Neural Information Processing Systems, 1994, 8 Pages.
Maurer, et al., "Empirical Bernstein Bounds and Sample Variance Penalization", In Proceedings of the Twenty-Second Annual Conference on Learning Theory, 2009, 9 Pages.
McKay, et al., "Comparison of Three Methods for Selecting Values of Input Variables in the Analysis of Output from a Computer Code", In Proceedings of the Technometrics, vol. 21, Issue 2, May 1979, pp. 239-245.
Meijer, Erik, "The World According to LINQ", In Proceedings of the Communications of the ACM, vol. 54, Issue 10, Aug. 1, 2011, 13 Pages.
Melnik, et al., "Dremel: Interactive Analysis of Web-Scale Datasets", In Proceedings of the VLDB Endowment, vol. 3, Issue 1, Sep. 13, 2010, 10 Pages.
Michael, et al., "Simple, Fast, and Practical Non-Blocking and Blocking Concurrent Queue Algorithms", In Proceedings of the 15th Annual ACM Symposium on Principles of Distributed Computing, May 23, 1996, 9 Pages.
Moritz, D, et al., "Trust, but Verify: Optimistic Visualizations of Approximate Queries for Exploring Big Data", In Conference on Human Factors in Computing Systems, May 2, 2017, 12 Pages.
Neumeyer, et al., "S4: Distributed Stream Computing Platform", In International Conference on Data Mining Workshops, Dec. 13, 2010, 8 Pages.
Nielsen, Jakob, "Response times: The 3 Important Limits", In Book of Usability Engineering, Jan. 1, 1993, 7 Pages.
North, Chris, "Toward Measuring Visualization Insight", In Journal of IEEE Computer Graphics and Applications, vol. 26, Issue 3, May 1, 2006, pp. 20-23.
Olken, et al., "Random Sampling from Database Files: A Survey", In Proceedings of the 5th International Conference on Statistical and Scientific Database Management, 1990, pp. 92-111.
Olken, et al., "Simple Random Sampling from Relational Databases", In Proceedings of the Twelfth International Conference on Very Large Data Bases, Aug. 1986, pp. 160-169.
Olston, et al., "Pig Latin: A Not-So-Foreign Language for Data Processing", In Proceedings of the ACM SIGMOD International Conference on Management of Data, Jun. 9, 2008, pp. 1099-1110.
Olston, et al., "Visualizing Data with Bounded Uncertainty", In Proceedings of the IEEE Symposium on Information Visualization, Oct. 28, 2002, 8 Pages.
"International Preliminary Report on Patentability Issued in PCT Application No. PCT/US2013/049820", dated Feb. 19, 2015, 11 Pages.
"International Search Report and Written Opinion Issued in PCT Application No. PCT/US2013/049820", dated May 26, 2014, 13 Pages.
"PCT Demand under Article 34 Issued in PCT Application No. PCT/US2013/049820", Filed Date: Aug. 26, 2014, 18 Pages.
"Second Written Opinion Issued in PCT Application No. PCT/US2013/049820", dated Sep. 24, 2014, 10 Pages.
"International Preliminary Report on Patentability Issued in PCT Patent Application No. PCT/US2014/041450", dated Aug. 12, 2015, 10 Pages.
"International Search Report and Written Opinion Issued in PCT Application No. PCT/US2014/041450", dated Nov. 25, 2014, 14 Pages.
"PCT Demand and Article 34 Issued in PCT Application No. PCT/US2014/041450", Filed Date: Mar. 11, 2015, 18 Pages.
"Second Written Opinion Issued in PCT Patent Application No. PCT/US2014/041450", dated Apr. 22, 2015, 9 Pages.
"International Search Report and Written Opinion Issued in PCT Application No. PCT/US2017/038407", dated Aug. 31, 2017, 15 Pages.
Perrot, et al., "Large Interactive Visualization of Density Functions on Big Data", In Proceedings of 5th IEEE Symposium on Large Data Analysis and Visualization, Oct. 2015, 9 Pages.
Pezzotti, et al."Approximated and User Steerable tSNE for Progressive Visual Analytics", In Journal of IEEE Transactions on Visualization and Computer Graphics, Dec. 2015, 15 Pages.
Pike, et al., "Interpreting the Data: Parallel Analysis with Sawzall", In Scientific Programming—Dynamic Grids and Worldwide Computing, vol. 13, Issue 4, Oct. 1, 2005, pp. 277-298.
Piringer, et al., "A Multi-Threading Architecture to Support Interactive Visual Exploration", In Proceedings of the IEEE Transactions on Visualization and Computer Graphics, vol. 15, Issue 6, Oct. 23, 2009, pp. 1113-1120.
Pirolli, et al., "The Sensemaking Process and Leverage Points for Analyst Technology as Identified Through Cognitive Task Analysis", In Proceedings of International Conference on Intelligence Analysis, vol. 5, May 2, 2005, 6 Pages.
Raman, et al., "Online Dynamic Reordering for Interactive Data Processing", In Proceedings of the 25th International Conference on Very Large Data Bases, vol. 99, Sep. 7, 1999, 19 Pages.
Zhou, et al., "Incorporating Partitioning and Parallel Plans into the SCOPE Optimizer", In the 26th International Conference on Data Engineering, Mar. 1, 2010, 12 Pages.
Robertson, et al., "Effectiveness of Animation in Trend Visualization", In Proceedings of the IEEE Transactions on Visualization and Computer Graphics, vol. 14, Issue 6, Nov. 2008, 8 Pages.
Rowstron, "Nobody Ever Got fired for Using Hadoop on a Cluster", In Proceedings of the 1st International Workshop on Hot Topics in Cloud Data Processing, Apr. 10, 2012, 5 Pages.
Rusu, et al., "Statistical Analysis of Sketch Estimators", In Proceedings of the ACM SIGMOD International Conference on Management of Data, Jun. 11, 2007, 12 Pages.
Ryvkina, et al., "Revision Processing in a Stream Processing Engine: A High-Level Design", In Proceedings of the 22nd International Conference on Data Engineering, Apr. 3, 2006, 3 Pages.
Salton, et al., "Term-Weighting Approaches in Automatic Text Retrieval", In Proceedings of the Information Processing & Management, vol. 24, Issue 5, Aug. 1, 1988, pp. 513-523.
Sanyal, et al., "A User Study to Compare Four Uncertainty Visualization Methods for 1D and 2D Datasets", In Proceedings of the IEEE Transactions on Visualization and Computer Graphics, vol. 15, Issue 6, Nov./Dec. 2009, pp. 1209-1218.
Sato, Kazunori, "An Inside Look at Google BigQuery", Retrieved From: <<https://cloud.google.com/files/BigQueryTechnicalWP.pdf>>, Retrieved Date: Feb. 20, 2013, 12 Pages.
Seow, Steven C., "Designing and Engineering Time: the Psychology of Timer Perception in Software", In Addison-Wesley Professional, 2008, 251 Pages.
Shneiderman, Ben, "Extreme Visualization: Squeezing a Billion Records into a Million Pixels", In Proceedings of the ACM SIGMOD International Conference on Management of Data, Jun. 9, 2008, 10 Pages.

(56) References Cited

OTHER PUBLICATIONS

Simonson, et al., "A DBMS for The US Bureau of The Census", In Proceedings of the ACM 1st International Conference on Very Large Data Bases, 1975, 3 Pages.

Skeels, et al., "Revealing Uncertainty for Information Visualization", In Proceedings of the ACM Working Conference on Advanced Visual Interfaces, May 28, 2008, 4 Pages.

Slezak, et al., "Towards Approximate SQL: Infobright's Approach", In Proceedings of the 7th International Conference on Rough Sets and Current Trends in Computing, 2010, pp. 630-639.

Smith, et al., "FacetMap: A Scalable Search and Browse Visualization", In Proceedings of the IEEE Transactions on Visualization and Computer Graphics, vol. 12, Issue 5, Nov. 20, 2006, 8 Pages.

Srivastava, et al., "Flexible Time Management in Data Stream Systems", In the Symposium on Principles of Database Systems, Jun. 14, 2004, 11 Pages.

Fisher, et al., "Exploratory Visualization Involving Incremental, Approximate Database Queries and Uncertainty", In Proceedings of the IEEE Computer Graphics and Applications, vol. 32, Issue 4, Jul./Aug. 2012, 8 Pages.

Fisher, Danyel, "Hotmap: Looking at Geographic Attention", In Proceedings of the Transactions on Visualization and Computer Graphics, vol. 13, Issue 6, Nov. 2007, 8 Pages.

Fisher, Danyel, "Incremental, Approximate Database Queries and Uncertainty for Exploratory Visualization", In Proceedings of the IEEE Symposium on Large Data Analysis and Visualization, Oct. 23, 2011, 8 Pages.

Fisher, et al., "Trust Me, I'm Partially Right: Incremental Visualization Lets Analysts Explore Large Datasets Faster", In Proceedings of the ACM SIGCHI Conference on Human Factors in Computing systems, May 5, 2012, 10 Pages.

Fisher, et al., "U.S. Appl. No. 61/671,038", filed Jul. 12, 2012, 48 Pages.

Franklin, et al., "Continuous Analytics: Rethinking Query Processing in a Network-Effect World", In Proceedings of the CIDR, Jan. 4, 2009, 6 Pages.

Freedman, David A., "Statistical Models: Theory and Practice", Retrieved From: http://www.stat.berkeley.edu/-census/repgibson.pdf, Oct. 2005, 2 Pages.

Ganti, et al., "Precomputing Search Features for Fast and Accurate Query Classification", In Proceedings of the Third ACM International Conference on Web Search and Data Mining, Feb. 4, 2010, 10 Pages.

Garrett, et al., "Real-Time Incremental Visualization of Dynamic Ultrasound Volumes Using Parallel BSP Trees", In Proceedings of the 7th Conference on Visualization, Oct. 27, 1996, 7 Pages.

Gates, et al., "Building a High-Level Dataftow System on Top of Map-Reduce: The Pig Experience", In Proceedings of the VLDB Endowment, vol. 2, Issue 2, Aug. 24, 2009, 12 Pages.

Ghemawat, et al., "The Google File System", In Proceedings of the 19th ACM SIGOPS Operating Systems Review, vol. 37, Issue 5, Oct. 19, 2003, pp. 29-43.

Gift, Noah, "Solve Cloud-Related Big Data Problems with MapReduce", Retrieved From: https://web.archive.org/web/20160616223631/http://www.ibm.com/developerworks/cloud/library/cl-bigdata/cl-bigdata-pdf.pdf, Nov. 8, 2010, 6 Pages.

Gilbert, George, "Real-time Query for Hadoop Democratizes Access to Big Data Analytics", Retrieved From: https://gigaom.com/report/real-time-query-for-hadoop-democratizes-access-to-big-data-analytics/, Oct. 22, 2012, 18 Pages.

Godfrey, et al., "Interactive Visualization of Large Data Sets", In Proceedings of IEEE Transactions on Knowledge and Data Engineering, vol. 28, No. 8, Aug. 2016, pp. 2142-2157.

Golab, et al., "Stream Warehousing with DataDepot", In Proceedings of the ACM SIGMOD International Conference on Management of Data, Jun. 29, 2009, 7 Pages.

Goldstein, et al., "Big Data Analytics: Temporal Semantics, Frameworks, and Applications", In the Work Performed at Internship at Microsoft Research, 16 Pages.

Graefe, Goetz, "The Cascades Framework for Query Optimization", In Proceedings of the IEEE Data Engineering Bulletin, vol. 18, Issue 3, Sep. 1995, pp. 19-28.

Grover, et al., "Extending Map-Reduce for Efficient Predicate-Based Sampling", In International Conference on Data Engineering, Apr. 1, 2012, 12 Pages.

Haas, et al., "Research Report, Join Algorithms for Online Aggregation", In Proceedings of the Research Report RJ 10126 (95001), IBM Almaden Research, Jun. 30, 1998, 42 Pages.

Haas, et al., "Ripple Joins for Online Aggregation", In Proceedings of the ACM SIGMOD International Conference on Management of Data, May 31, 1999, 12 Pages.

Haas, et al., "The Need for Speed: Speeding Up DB2 UDB Using Sampling", In DUG Solutions Journal, vol. 10, Issue 2, Sep. 2003, 4 Pages.

Hall, et al., "Processing a Trillion Cells per Mouse Click", In Proceedings of the VLDB Endowment, vol. 5, Issue 11, Aug. 27, 2012, 11 Pages.

Hammad, et al., "Nile: A Query Processing Engine for Data Streams", In Proceedings of the 20th International Conference on Data Engineering, Mar. 30, 2004, 1 Page.

Harris, Derrick, "Cloudera makes SQL a First-Class Citizen in Hadoop", Retrieved From: http://gigaom.com/2012/10/24/cloudera-makes-sql-a-first-class-citizen-in-hadoop/, Oct. 24, 2012, 5 Pages.

He, et al., "Comet: Batched Stream Processing for Data Intensive Distributed Computing", In Proceedings of the 1st ACM Symposium on Cloud Computing, Jun. 10, 2010, 12 Pages.

Heer, et al., "Animated Transitions in Statistical Data Graphics", In Proceedings of the IEEE Transactions on Visualization and Computer Graphics, vol. 13, Issue 6, Nov. 2007, pp. 1240-1247.

Heer, et al., "Graphical Histories for Visualization: Supporting Analysis, Communication, and Evaluation", In Journal of IEEE Transactions on Visualization and Computer Graphics, vol. 14, Issue 6, Nov. 2008, 8 Pages.

Hellerstein, et al., "Interactive Data Analysis: The Control Project", In Computer, vol. 32, Issue 8, Aug. 1999, pp. 51-59.

Hellerstein, et al., "Informix under CONTROL: Online Query Processing", In Journal of Data Mining and Knowledge Discovery, vol. 4, Issue 4, Oct. 2000, 34 Pages.

Hoeffding, Wassily, "Probability Inequalities for Sums of Bounded Random Variables", In Journal of the American Statistical Association, vol. 58, Issue 301, Mar. 1963, 18 Pages.

Hu, et al., "Demographic Prediction Based on User's Browsing Behavior", In Proceedings of the ACM 16th International Conference on World Wide Web, May 8, 2007, 10 Pages.

Hullman, et al., "Hypothetical Outcome Plots Outperform Error Bars and Violin Plots for Inferences about Reliability of Variable Ordering", In PloS one, vol. 10, Issue 11, Nov. 16, 2015, 36 Pages.

Isard, et al., "Dryad: Distributed Data-Parallel Programs from Sequential Building Blocks", In Proceedings of the 2nd ACM SIGOPS/EuroSys European Conference on Computer Systems, Mar. 21, 2007, 14 Pages.

Jackson, Christopher H., "Statistical Computing and Graphics: Displaying Uncertainty With Shading", In Proceedings of the American Statistician, vol. 62, Issue 4, 2002, 8 Pages.

Jensen, et al., "Temporal Specialization", In Proceedings of the Eighth International Conference on Data Engineering, Feb. 2, 1992, 10 Pages.

Jermaine, et al., "Scalable Approximate Query Processing With The DBO Engine", In Proceedings of the ACM Transactions on Database Systems, vol. 33, Issue 4, Nov. 2008, 12 Pages.

Jermaine, et al., "The Sort-Merge-Shrink Join", In Proceedings of the ACM Transactions on Database Systems, vol. 31, Issue 4, Dec. 2006, 35 Pages.

Jerzy Neyman, "Outline of a Theory of Statistical Estimation Based on the Classical Theory of Probability", In Publication of Royal Society, Aug. 30, 1937, 48 Pages.

Joshi, et al., "Materialized Sample Views for Database Approximation", In Proceedings of the IEEE Transactions on Knowledge and Data Engineering, vol. 20, Issue 3, Mar. 2008, 15 Pages.

Joslyn, et al., "Decisions with Uncertainty: The Glass Half full", In Journal of Current Directions in Psychological Science, vol. 22, Issue 4, Aug. 1, 2013, 3 Pages.

(56) References Cited

OTHER PUBLICATIONS

Kamat, et al., "Distributed and Interactive Cube Exploration", In Proceedings of IEEE 3oth International Conference on Data Engineering, Mar. 31, 2014, 12 Pages.

Kampstra, Peter, "Beanplot: A Boxplot Alternative for Visual Comparison of Distributions", In Journal of Statistical Software, Code Snippets, vol. 28, Issue 1, Nov. 2008, 9 Pages.

Kim, et al., "Selecting the Best System: Theory and Methods", In Proceedings of the 35th Conference on Winter Simulation, vol. 1, 2003, pp. 101-112.

Koh, et al., "ManiWordle: Providing Flexible Control Over Wordle", In Proceedings of the IEEE Transactions on Visualization and Computer Graphics, vol. 16, Issue 6, Nov. 2010, 8 Pages.

Kosara, et al., "Semantic Depth of Field", In Proceedings of the IEEE Symposium on Information Visualization, 2001, 8 Pages.

Kramer, et al., "A Temporal Foundation for Continuous Queries Over Data Streams", Retrieved From: <<http://dbs.mathematik.uni-marburg.de/publications/myPapers/2005/KS05COMAD.pdf>>, Jan. 6, 2005, pp. 70-82.

Kwon, et al., "Skewtune: Mitigating Skew in MapReduce Applications", In Proceedings of the ACM SIGMOD International Conference on Management of Data, May 20, 2012, 12 Pages.

Laptev, et al., "Early Accurate Results for Advanced Analytics on MapReduce", In Proceedings of the VLDB Endowment, vol. 5, Issue 10, Aug. 27, 2012, 12 Pages.

Lins, et al., "Nanocubes for Real-Time Exploration of Spatiotemporal Datasets", In IEEE Transactions on Visualization and Computer Graphics, vol. 19, Issue 12, Dec. 2013, 10 Pages.

Liu, et al., "imMens: Real-time Visual Querying of Big Data", In Publication of Wiley Online Library, Jun. 1, 2013, 4 Pages.

"Bing Vs. Google, Google: Comparing them Side-by-Side", Retrieved From: https://gigaom.com/2009/08/14/bing-vs-google-comparing-them-side-by-side/, Aug. 14, 2009, 5 Pages.

"Getting Started with Labchart for Teaching", Retrieved From: http://cdn.adinstruments.com/adi-web/brochures/Getting_Started_with_LabChart_for_Teaching.pdf, Oct. 24, 2013, 24 Pages.

"Graphing with Excel", Retrieved From: https://projects.ncsu.edu/labwrite/res/gt/gt-sup-home.html, May 16, 2005, 5 Pages.

"Non Final Office Action Issued in U.S. Appl. No. 15/453,690", dated Feb. 6, 2019, 17 Pages.

"Final Office Action Issued in U.S. Appl. No. 15/453,690", dated Jul. 1, 2019, 25 Pages.

"Office Action Issued in Brazilian Patent Application No. BR112015000353-2", dated Jan. 13, 2020, 5 Pages.

"Office Action Issued in Indian Patent Application No. 9320/CHENP/2014", dated Feb. 25, 2020, 8 Pages.

\* cited by examiner

AGGREGATE-QUERY DATABASE SYSTEM AND PROCESSING

BACKGROUND

Users increasingly turn to computing services, such as database engines, to analyze large volumes of data. For example, Online Analytical Processing (OLAP) systems can be designed to analyze clinical-testing or business-intelligence (BI) data. However, many database systems cannot provide realtime or near-realtime query responses on large datasets. As a result, users must plan their analyses ahead of time and cannot engage in exploratory analysis to attempt to locate patterns in the data. Some "approximate query processing" (AQP) database systems reduce response delay by providing approximate answers to queries. However, answers provided by these systems may be far from the actual answer, preventing users from relying on the approximate results.

SUMMARY

This disclosure describes systems, methods, and computer-readable media for building databases and/or processing queries. In some examples, a computing device can determine a first subset of a data set, the first subset comprising first data records selected from the data set based at least in part on respective measure values of the first data records. The computing device can determine an index comprising a mapping from a predicate to one or more second data records of the data set associated with the predicate and to respective approximation values associated with the one or more second data records. The computing device can then process a query against the first subset to provide a first result and a first accuracy value, determine that the first accuracy value does not satisfy a predetermined accuracy criterion, and process the query against the index to provide a second result.

According to example query-processing techniques herein, the computing device can process a query against a first subset of a data set to provide a first query result, the first subset comprising first data records selected from the data set based at least in part on respective measure values of the first data records. The computing device can determine that the first query result does not satisfy a predetermined accuracy criterion. The computing device can then process the query against a second subset of the data set to provide a second query result, the second subset comprising second data records selected from the data set, wherein individual records of the second data records satisfy a predetermined predicate of the second subset.

According to example database-building techniques herein, the computing device can receive, via the communications interface, a plurality of data records. A first data record of the plurality of data records can include a first discrete value and a first measure value, and a second data record of the plurality of data records can include a second discrete value and a second measure value greater than the first measure value. The computing device can determine a first subset of the plurality of data records, wherein the second data record occurs in the first subset more frequently than does the first data record.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Examples described herein provide techniques and constructs to improve the processing of queries, e.g., aggregation queries providing a sum, count, or other statistic of data in a database column. Examples described herein provide techniques and constructs to permit a computing system to more rapidly provide approximate query responses. Examples herein provide accurate information about the magnitude of possible error in an approximate query response compared to an exact (non-approximate) query response. Examples herein can reduce the number of system interactions required by the user to achieve the user's goals, thus reducing the bandwidth required for communication between the system and the user. Examples herein are given with respect to, e.g., OLAP systems and relational databases, but these examples are not limiting. Example techniques herein can be adapted to other data-storage systems, e.g., XML (Extensible Markup Language) databases and HADOOP files.

Various entities, configurations of electronic devices, and methods for processing queries, e.g., for OLAP applications, are described further with reference to FIGS. 1-12. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

Figure 1:
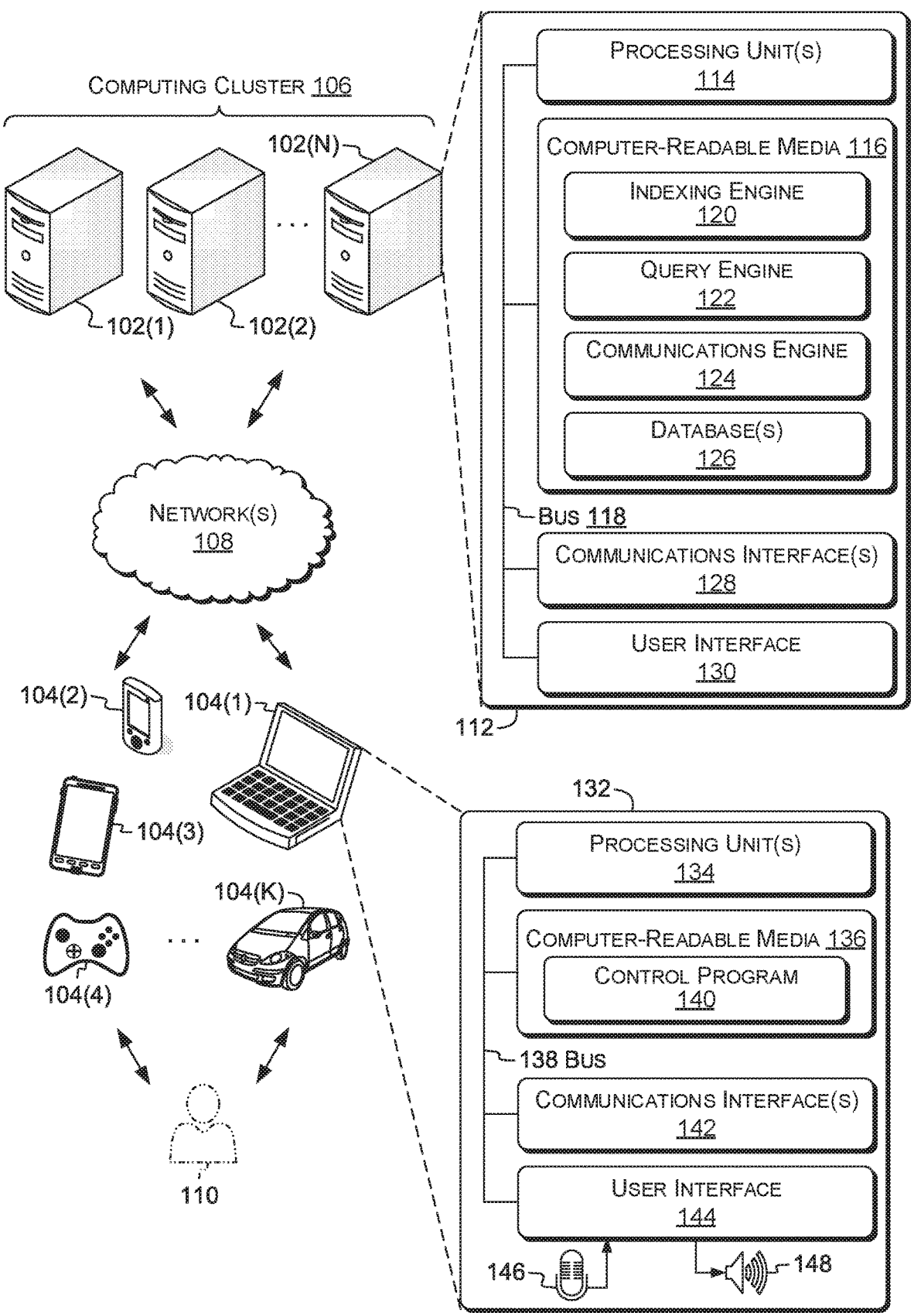
FIG. 1 is a block diagram depicting an example environment for building databases or processing queries as described herein.

FIG. 1 shows an example environment 100 in which examples of database-building or query-processing systems can operate and/or in which database-building or query-processing methods such as those described herein can be performed. In the illustrated example, the various devices and/or components illustrated in environment 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as MICROSOFT AZURE, GOOGLE CLOUD PLATFORM, or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), represented graphically as a gamepad), automotive computers such as vehicle control systems, vehicle security systems, and/or electronic keys for vehicles (e.g., 104(K), represented graphically as an automobile), desktop computers, and/or integrated components for inclusion in computing devices, appliances, and/or other computing device(s) configured to participate in and/or carry out query processing as described herein, e.g., for control purposes. In some examples, as indicated, computing device(s), e.g., computing devices 102(1) and 104(1), can intercommunicate to participate in and/or carry out query processing as described herein. For example, computing device 104(K) can be or include a data source operated by a user and computing device 102(1) can be a query-processing system, as described below with reference to, e.g., FIGS. 2-10.

Different devices and/or types of computing devices 102 and 104 can have different needs and/or ways of interacting with cluster 106. For example, computing devices 104 can interact with cluster 106 with discrete request/response communications, e.g., for queries and responses using a database already populated with data. Additionally and/or alternatively, computing devices 104 can be data sources and can interact with cluster 106 with discrete and/or ongoing transmissions of data to be stored in a database. For example, a data source in an automobile, e.g., a computing device 104(K) associated with an interactive voice-response system in the automobile, can provide to cluster 106 data of location and environmental conditions around the car. This can provide broader coverage of results of a database search by increasing the amount of data input to the database. Additionally and/or alternatively, computing devices 104 can be data sinks and can interact with cluster 106 with discrete and/or ongoing requests for query results from a database, e.g., estimated drive times based on changing traffic conditions. For example, an estimated drive time can be determined as an approximate result of a query including an AVERAGE aggregate on a trip-time column.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks. WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction. An example data source can be a real-time data and/or video stream from a drone and/or other remotely-operated vehicle or from a webcam. Such a video stream can be carried via high-bandwidth, low-latency networks. By contrast, low-bandwidth networks can be used to carry textual queries from users, responses to users, or data such as measurements from environmental sensors such as temperature sensors. Such sensors can provide infrequent updates, e.g., one value per minute of a gradually changing temperature.

In some examples, computing devices 102 and/or 104, e.g., laptops, smartphones, and/or other computing devices 102 and/or 104 described above, interact with an entity 110. The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 operate query engines 122 to determine responses corresponding to user queries, and transmit indications of the responses via network 108 to computing device 104(3), e.g., a smartphone. Computing device 104(3) can, e.g., present information of the response to a query to entity 110. Examples of query processing are discussed in more detail below with reference to FIGS. 3-10.

Still referring to the example of FIG. 1, details of an example computing device 102(N) are illustrated at inset 112. The details of example computing device 102(N) can be representative of others of computing device(s) 102. However, each of the computing device(s) 102 can include additional or alternative hardware and/or software components. The illustrated computing device 102(N) can include one or more processing unit(s) 114 operably connected to one or more computer-readable media 116, e.g., memories, such as via a bus 118, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing units 114 can exchange data through an internal interface bus (e.g., PCIe), rather than and/or in addition to network 108. While the processing units 114 are described as residing on the computing device 102(N), in this example, the processing units 114 can also reside on different computing device(s) 102 and/or 104 in some examples. In some examples, at least two of the processing units 114 can reside on different computing device(s) 102 and/or 104. In such examples, multiple processing units 114 on the same computing device 102 and/or 104 can use a bus 118 of the computing device 102 and/or 104 to exchange data, while processing units 114 on different computing device(s) 102 and/or 104 can exchange data via network(s) 108.

Computer-readable media described herein, e.g., computer-readable media 116, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 116 can store instructions executable by the processing unit(s) 114. Computer-readable media 116 can store, for example, computer-executable instructions of an operating system (omitted for brevity), module(s) of an indexing engine 120, module(s) of a query engine 122, module(s) of a communications engine 124, and/or other modules, programs, and/or applications that are loadable and executable by processing unit(s) 114. For example, the computer-executable instructions stored on the computer-readable media 116 can upon execution configure a computer such as a computing device 102 and/or 104 to perform operations described herein with reference to the operating system, the indexing engine 120, the query engine 122, and/or the communications engine 124. In some examples, at least one of the indexing engine 120, the query engine 122, and/or the communications engine 124 can be included in a database server, or can be embodied as, e.g., a database front-end or gateway.

In some examples not shown, one or more of the processing unit(s) 114 in one of the computing device(s) 102 and/or 104 can be operably connected to computer-readable media 116 in a different one of the computing device(s) 102 and/or 104, e.g., via communications interface 128 (discussed below) and network 108. For example, program code to perform steps of flow diagrams herein, e.g., as described herein with reference to indexing engine 120 or query engine 122, can be downloaded from a server, e.g., computing device 102(1), to a client, e.g., computing device 104(K), e.g., via the network 108, and executed by one or more processing unit(s) in computing device 104(K).

Computer-readable media 116 can also store one or more database(s) 126, individually and/or collectively referred to herein with reference 126. In some examples, database(s) 126 can include data record(s), unique identifier(s) of data record(s) (e.g., unique data record numbers in relational-database tables), index(es), subset(s) of data record(s), index record(s), or other types of data or metadata described herein.

In some examples, algorithms for processing queries against databases 126 as described herein can be performed on a computing device (e.g., computing device 102), such as a smart phone, a tablet, a desktop computer, a server, a server blade, a supercomputer, etc. The query results can be presented by, or further processed on or using, such computing devices and/or computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 104 can perform incremental updating of a database 126 and the computing device(s) 102 can perform updating of index(es) associated with the database 126, e.g., as described below with reference to FIGS. 3-12.

In various examples, e.g., of databases for responding to user queries and/or other use cases noted herein, the databases may include, but are not limited to, relational databases. XML or other tree-structured databases, or other databases. The indexing engine 120 can be configured to load data into database(s) 126 and/or to determine index(es) or subset(s) of database(s) 126, e.g., as discussed herein with reference to FIG. 3.

The query engine 122 can be configured to use the data of database(s) 126, and/or of index(es) or subset(s) to, e.g., determine a response to a user query, and/or to perform other data analysis and/or processing. For example, the query engine 122 can determine approximate query answers as described herein. The communications engine 124 can communicate information, e.g., between entity 110 and databases 126 designed for processing or responding to user queries.

Computing device 102 can also include one or more communications interface(s) 128 connected via the bus 118 to processing units 114 to enable wired and/or wireless communications between computing device(s) 102 and other networked computing devices 102 and/or 104 involved in cluster computing, and/or other computing device(s), e.g., over network(s) 108. The processing units 114 can exchange data through respective communications interface(s) 128, which can transmit and receive data via bus 118 or network 108. In some examples, the communications interface 128 can include, but is not limited to, a transceiver for cellular (3G, 4G, and/or other), WI-FI, Ultra-wideband (UWB). BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include at least one user-interface device or user interface, at least one bus such as a memory bus and/or local bus, at least one memory interface, and/or at least one hardwired interface such as a 0-20 mA control line. For simplicity, these and other components are omitted from the illustrated computing device 102(N) and from inset 112.

In some examples, computing device 102 can include a user interface 130 configured to permit a user, e.g., entity 110 and/or a database administrator, to operate the indexing engine 120, the query engine 122, and/or the communications engine 124. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 114. Some examples of computer-readable media 136 are discussed above with reference to computer-readable media 116. For example, computer-readable media 136 can include one or more computer storage media. Some examples of bus 138 are discussed above with reference to bus 118.

Computer-readable media 136 can store, for example, computer-executable instructions of an operating system (omitted for brevity), a communications engine (omitted for brevity), a control program 140 and/or module(s) thereof, and/or other modules, programs, and/or applications that are loadable and executable by processing unit(s) 136.

In some examples, the control program 140 can be configured to receive inputs. e.g., via a keyboard, transmit corresponding queries to a computing device 102, receive responses from computing device 102, and present the responses, e.g., via a display. In some examples, query processing is carried out on computing device(s) 102. In some of these examples, the control program 140 can be configured to receive inputs, transmit a query to computing device(s) 102, receive query results (if any) from computing device(s) 102, and/or present the received query results, e.g., via user interface 144 (discussed below). In some examples, determination and operation are carried out on a computing device 104. In some of these examples, the control program 140 can be configured to receive inputs and query database(s) 126 using instructions of query engine 122 based at least in part on those inputs, e.g., to determine a query result. In some examples, control program 140 can execute instructions of indexing engine 120 to maintain or update a database, e.g., on computing device 104. In some examples, the control program 140 can include, but is not limited to, a Web browser, smartphone app or desktop application, background service conducting or monitoring network communications, or instant-messaging client, or can include components of any of those configured to perform functions described herein. For clarity herein, various examples are discussed with reference to a Web browser. Other types of control programs 140 can be used with those examples except as expressly indicated.

In some examples, the computing device 104 can be configured to communicate with computing device(s) 102 to query a database 126. For example, the computing device 104 can transmit a query to computing device(s) 102, receive a response, and take action based on that response. For example, the computing device 104 can provide to entity 110 information included in the response.

Computing device 104 can also include one or more communications interfaces 142 connected via the bus 138 to processing unit(s) 134 to enable wired and/or wireless communications between computing device(s) 104 and other networked computing devices 102 and/or 104 involved in cluster computing, and/or other computing device(s), over network(s) 108. Some examples are discussed above with reference to communications interface 128.

In some examples, computing device 104 can include a user interface 144. For example, computing device 104(N) can provide user interface 144 to control and/or otherwise interact with cluster 106 and/or computing devices 102 therein. For example, processing unit(s) 134 can receive inputs of user actions via user interface 144 and transmit corresponding data via communications interface 142 to computing device(s) 102.

User interface 130 and/or 144 can include one or more input devices, integral and/or peripheral to computing device 102 and/or 104. The input devices can be user-operable, and/or can be configured for input from other computing device 102 and/or 104. Examples of input devices can include. e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 130 and/or user interface 144. In some examples, user interface 130 and/or user interface 144 can include a microphone 146 or other audio-input device, and computing device 104 can execute a speech-recognition engine (omitted for brevity) to determine, e.g., textual data of queries from input audio detected by microphone 146.

User interfaces 130 and/or 144 can include one or more result devices configured for communication to a user and/or to another computing device 102 and/or 104. Result devices can be integral and/or peripheral to computing device 102 and/or 104. Examples of result devices can include a display, a printer, audio speakers, beepers, and/or other audio result devices, a vibration motor, linear vibrator, and/or other haptic result device, and the like. Actions, e.g., presenting to entity 110 information of or corresponding to a result of a query against a database 126, can be taken via user interface 130 and/or user interface 144. In some examples, user interface 130 and/or user interface 144 can include a speaker 148 or other audio-result device, and computing device 104 can execute a speech-synthesis engine (omitted for brevity) to determine, e.g., audio data of actions from text or other data of those actions, e.g., received via network 108. Although shown as part of computing device 104, microphone 146 and speaker 148 can be separate from computing device 104 and communicatively connectable therewith.

In some examples, computing device 104 permits entity 110 to carry out multiple interactions with computing device 102 over the course of a session. A session can include, e.g., communications or interactions during a persistent network connection such as a Telnet connection, or a series of user interactions with a particular Web server or portal (e.g., across one or more HTTP connections). A session can be represented by or conducted with a server such as computing device 102. Computing devices 102 or 104 can store or exchange session data; exchanges can be carried out. e.g., via HTTP or other protocols. Session data can include, but is not limited to, at least one of: textual data of the session, e.g., a query or queries provided by entity 110 (including, but not limited to, text produced by a speech-recognition engine); text or timestamps of instant messages, text messages, social-network postings, or other communications transmitted to or from entity 110; identification information of a user or other entity 110, historical information of the session, e.g., prior queries, responses, or actions taken; content created by, sent to, or otherwise related to, entity 110; image data, audio data; numerical data such as number of queries in the session; user profile information such as name, location, interests, or the like; information about connections between entity 110 and other entities, e.g., other users; or date/time data such as start time of the session, historical times and dates of sessions by the same user, or a time zone or local time of entity 110. As used herein, a user profile can be associated with a particular entity 110, e.g., a user, or with a multiple users or a group of users. A particular entity 110 can be associated with one, at least one, or more than one user profile. As used herein, a "timestamp" is a value that can represent a date, a time, or both.

Illustrative Components

Figure 2:
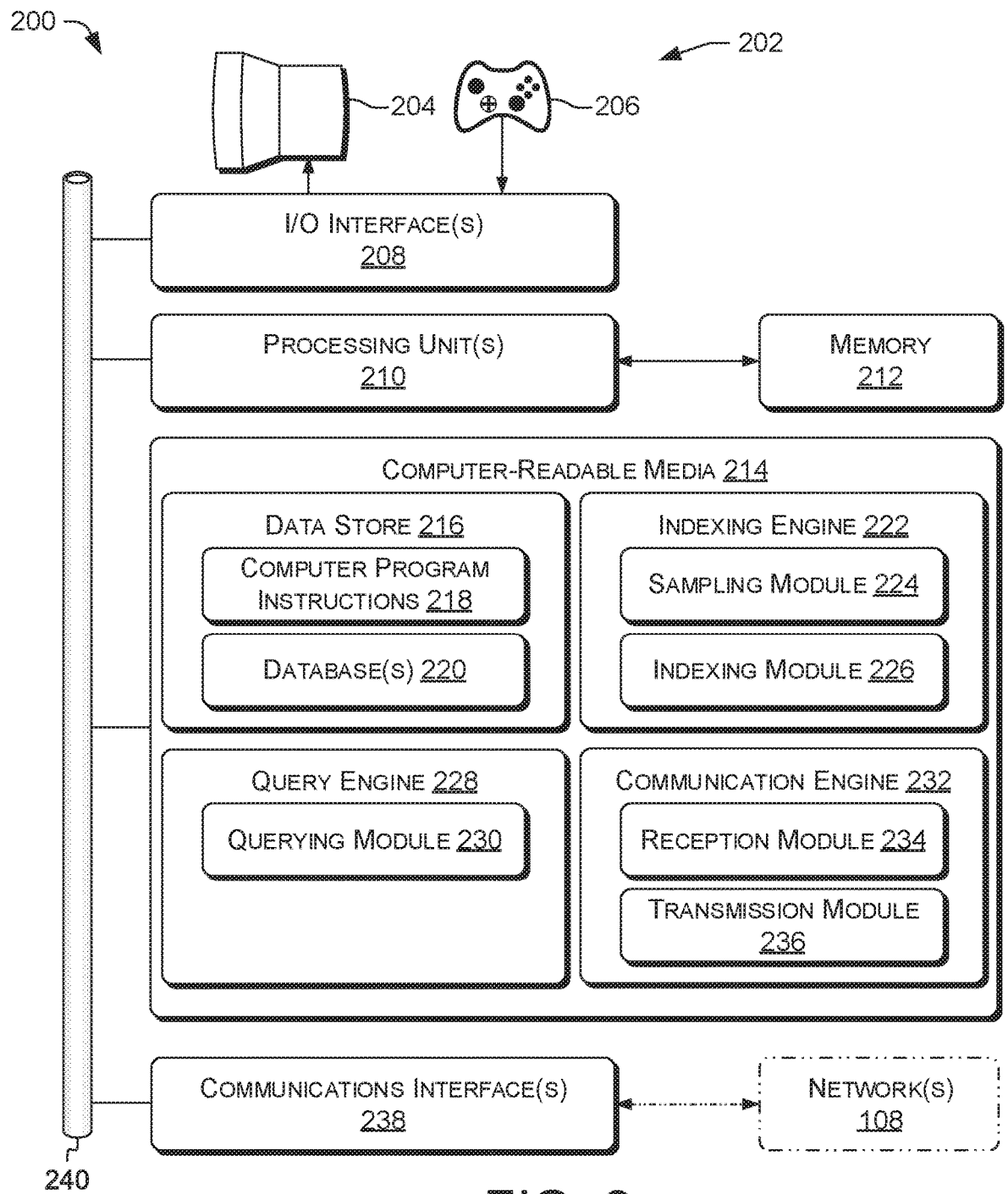
FIG. 2 is a block diagram depicting an example computing device configured to participate in building databases or processing queries according to various examples described herein.

FIG. 2 is an illustrative diagram that shows example components of a computing device 200, which can represent computing device(s) 102 and/or 104, and which can be and/or implement a query processing system, device, and/or apparatus, according to various examples described herein. Computing device 200 can include and/or be included in a system and/or device for database building or query processing as described herein.

Computing device 200 can include and/or be connected to a user interface 202, which can represent user interface 130 and/or 144. User interface 202 can include a display 204. Display 204 can include an organic light-emitting-diode (OLED) display, a liquid-crystal display (LCD), a cathode-ray tube (CRT), and/or another type of visual display. Display 204 can be a component of a touchscreen, and/or can include a touchscreen. User interface 202 can include various types of result devices described above with reference to user interface 130 and/or 144. In some examples, computing device 200 can be communicatively connected with a user interface 144, FIG. 1, of another computing device.

User interface 202 can include a user-operable input device 206 (graphically represented as a gamepad). User-operable input device 206 can include various types of input devices described above with reference to user interface 130 and/or 144, e.g., to provide voice or text input.

Computing device 200 can further include one or more input/output (I/O) interface(s) 208 to allow computing device 200 to communicate with input, result, and/or I/O devices (for clarity, some not depicted). Examples of such devices can include components of user interface 202 such as user-operable input devices and result devices described above with reference to user interface 130 and/or 144. Other examples of such devices can include power meters, accelerometers, and other devices for measuring properties of entity 110, computing device 200, and/or another computing device 102 and/or 104. Computing device 200 can communicate via I/O interface 208 with suitable devices and/or using suitable electronic/software interaction methods. Input data, e.g., of user inputs on user-operable input device 206, can be received via I/O interface 208 (e.g., one or more I/O interface(s)). Result data, e.g., of user interface screens, can be provided via I/O interface 208 to display 204, e.g., for viewing by a user.

The computing device 200 can include one or more processing unit(s) 210, which can represent processing unit(s) 114 and/or 134. In some examples, processing unit(s) 210 can include and/or be connected to a memory 212, e.g., a RAM and/or cache. Processing units 210 can be operably coupled to the I/O interface 208 and to at least one computer-readable media 214, which can represent computer-readable media 116 and/or 136, FIG. 1.

Processing unit(s) 210 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 210 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 210 of multiple types. For example, the processing units 210 in computing device 102(N) can be a combination of one or more GPG-PUs and one or more FPGAs. Different processing units 210 can have different execution models, e.g., as is the case for graphics processing units (GPUs) and central processing unit (CPUs).

Computer-readable media 214 can store instructions executable by processing unit(s) 210, and/or instructions executable by external processing units such as by an external central processing unit (CPU) and/or external processor of any type discussed herein. In some examples at least one processing unit 210, e.g., a CPU, graphics processing unit (GPU), and/or hardware logic device, can be incorporated in computing device 200, while in some examples at least one processing unit 210, e.g., one or more of a CPU, GPU, and/or hardware logic device, can be external to computing device 200.

In the illustrated example, computer-readable media 214 includes a data store 216. In some examples, data store 216 can include data storage, structured and/or unstructured, such as a database (e.g., a Structured Query Language, SQL, and/or NoSQL database) and/or data warehouse. In some examples, data store 216 can include a corpus and/or a relational database with one or more tables, arrays, indexes, stored procedures, and so forth to enable data access. Data store 216 can store data for the operations of processes, applications, components, and/or modules stored in computer-readable media 214 and/or computer instructions in those modules executed by processing unit(s) 210. In some examples, the data store can store computer program instructions 218 (e.g., instructions corresponding to processes described herein and/or to other software executable by processing unit(s) 210), one or more database(s) 220, which can represent databases 126, FIG. 1, database schema(s), and/or any combination thereof.

Computer-readable media 214, e.g., computer storage media, can store a plurality of modules of various engines; examples are discussed below. Processing unit(s) 210 can be configured to execute modules of the plurality of modules. For example, the computer-executable instructions stored on the computer-readable media 214 can upon execution configure a computer such as a computing device 200 to perform operations described herein with reference to the modules of the plurality of modules. The modules stored in the computer-readable media 214 can include instructions that, when executed by the one or more processing units 210, cause the one or more processing units 210 to perform operations described below.

Computing device 200 can implement an indexing engine 222, which can represent indexing engine 120, FIG. 1. The modules of the indexing engine 222 stored on computer-readable media 214 can include one or more modules, e.g., shell modules and/or API modules (and likewise throughout the document), which are illustrated as a sampling module 224 and an indexing module 226.

Computing device 200 can implement a query engine 228, which can represent query engine 122, FIG. 1. The modules of the query engine 228 stored on computer-readable media 214 can include one or more modules, which are illustrated as a querying module 230.

Computing device 200 can implement a communications engine 232, which can represent communications engine 124, FIG. 1. The modules of the communications engine 232 stored on computer-readable media 214 can include one or more modules, which are illustrated as a reception module 234 and a transmission module 236.

In the indexing engine 222, the query engine 228, and/or the communications engine 232, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the sampling module 224 and the indexing module 226 can be combined in a single module that performs at least some of the example functions described below of those modules, and likewise the reception module 234 and the transmission module 236. In some examples, computer-readable media 214 can include a subset of the above-described modules.

Computer-readable media 214 can also include an operating system (omitted for brevity). In some examples, an operating system is not used (commonly referred to as a "bare metal" configuration). In some examples, the operating system can include components that enable and/or direct the computing device 200 to receive data via various inputs (e.g., user controls, network and/or communications interfaces, memory devices, and/or sensors), and process the data using the processing unit(s) 210 to generate result. The operating system can further include one or more components that present the result (e.g., display an image on an electronic display, store data in memory, and/or transmit data to another computing device). The operating system can enable a user to interact with the computing device 200 using a user interface. Additionally, the operating system can include components that perform various functions generally associated with an operating system, e.g., storage management and internal-device management.

In the illustrated example, the computing device 200 includes a communications interface 238, which can represent communications interface 128 and/or 142. For example, communications interface 238 (e.g., one or more communications interface(s)) can include a transceiver device such as a network interface controller (NIC) to send and receive communications over a network 108 (shown in phantom), e.g., as discussed above. As such, the computing device 200 can have network capabilities. Communications interface 238 can include any number of network, bus, and/or memory interfaces, in any combination, whether packaged together and/or separately. In some examples, communications interface 238 can include a memory bus internal to a particular computing device 102 or 104, transmitting via communications interface 238 can include storing the transmitted data in memory 212 or computer-readable media 214, and receiving via communications interface 238 can include retrieving data from memory 212 or computer-readable media 214.

For example, the computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, data aggregators, and/or data feeds, e.g., accessible via application programming interfaces (APIs). The processing units 210 can retrieve data from the data source(s), e.g., via a Hypertext Transfer Protocol (HITP) request such as a GET to a Web Services and/or Representational State Transfer (REST) API endpoint.

In some examples, the processing unit(s) 210 can access the module(s) on the computer-readable media 214 via a bus 240, which can represent bus 118 and/or 138, FIG. 1. I/O interface 208 and communications interface 238 can also communicate with processing unit(s) 210 via bus 240.

Figure 3:
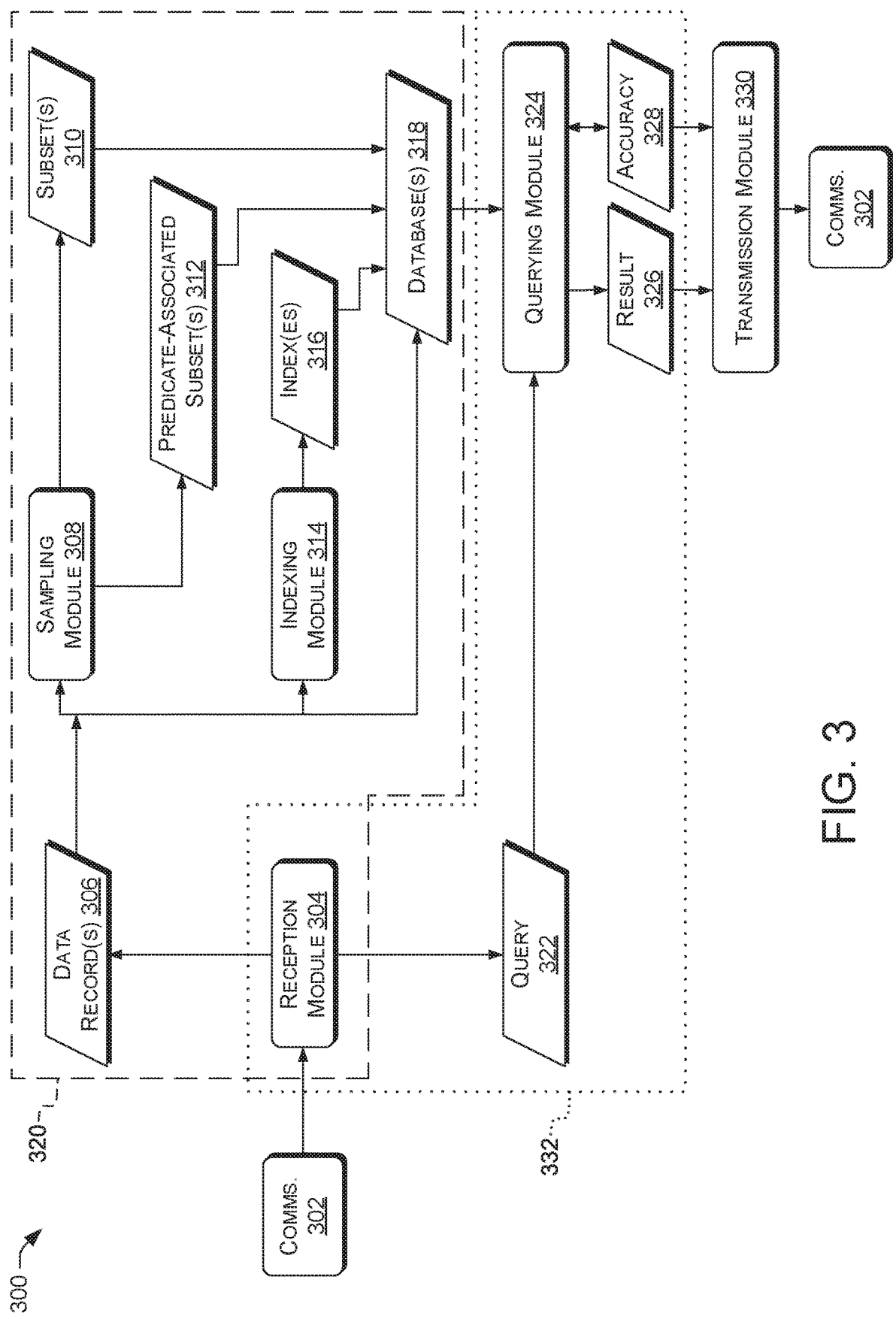
FIG. 3 is a dataflow diagram depicting example module interactions during building of a database or processing of a query, and example data items, according to various examples described herein.

FIG. 3 is a dataflow diagram 300 illustrating example interactions between the modules such as the modules illustrated in FIG. 2. For clarity, communications interface 302, which can represent communications interface 238, is depicted multiple places in this figure. Such depiction does not constrain the number of communications interface(s) 302 that may be used. Further details of operations herein are described below with reference to FIGS. 4-12. Modules described below can be configured to perform functions described below.

In some examples, a reception module 304, which can represent reception module 234, can be configured to receive a data record 306, or multiple data records 306, via the communications interface 302. The data record 306 can include values for one or more fields. The fields can include, e.g., columns in a relational-database table, and the data record can correspond to a row of such a table. Additionally or alternatively, the data record can include a node tree of XML data, and the fields can include individual elements or attributes of the tree. The data records 306 can include, e.g., text, audio, or other data representing facts, entities, relationships between facts or entities, or other information encoded for storage in a database(s) 318, discussed below.

For clarity of explanation, and without limitation, some examples are discussed herein with reference to a data set including a table of data records, e.g., a relational-database table. An example dataset is shown in Table 1.

TABLE 1

| EXAMPLE | | | | | | |
|---|---|---|---|---|---|---|
| ID | DV1 | DV2 | DV3 | DV4 | MV1 | MV2 |
| 1 | 0 | 0 | 0 | 1 | 1 | 3.14159 |
| : | 0 | 0 | 0 | 0 | 1 | 2.6535 |
| 90 | 0 | 0 | 0 | 1 | 1 | 8.9793 |
| 91 | 0 | 1 | 0 | 1 | 10 | 2.3846 |
| : | 0 | 1 | 0 | 0 | 10 | 2.6433 |
| 100 | 0 | 1 | 0 | 1 | 10 | 8.3279 |
| 101 | 1 | 0 | 0 | 1 | 1 | 5.0288 |
| : | 1 | 0 | 0 | 0 | 1 | 4.1971 |
| 198 | 1 | 0 | 0 | 1 | 1 | 6.9399 |
| 199 | 1 | 0 | 0 | 1 | 100 | 3.7510 |
| 200 | 1 | 0 | 1 | 1 | 100 | 5.8209 |

The example data set shown in Table 1 has 200 data records 306. Groups of adjacent data records 306 having the same field values are marked ":" in the "ID" column (e.g., the second row of Table 1, representing data records 306 #2-#89). Each data record 306 has a unique ID, four discrete values, DV1, DV2, DV3, and DV4, and two measure values, MV1 and MV2. In the illustrated example, for each record, DV1-DV3 are Boolean values represented as integers, MV1 is an integer, and MV2 is a real number. As used herein, the term "column" refers to corresponding fields of one or more data records, whether or not those records are stored in a table. For example, an XML database storing contact information can have "columns" for the XML Path Language (XPath) expressions "/person/name/last", "/person/address/city", and "/person/phone/localnumber". In examples in which not all data records have all fields, "column" refers to the corresponding fields of the data records wherever those corresponding fields exist.

As used herein, a "discrete value" is, e.g., a binary, categorical, ordinal, count, integer, rational, Boolean, character, string, or other value that can be meaningfully tested for exact equality against an arbitrary value on a computer. Discrete values do not include arbitrary real numbers represented as floating-point values, since in a computer, floating point-calculations are inexact so equality tests are not meaningful. For example, in MICROSOFT EXCEL and other systems implementing IEEE 754 arithmetic, the expression (43.1-43.2)+1 equals 0.89 rather than 0.9 due to the limited precision of floating-point computations. Therefore, the test (43.1−43.2)+1=0.9 is not meaningful in such a system, i.e., has the value False when it should, per the customary rules of arithmetic, have the value True. However, particular real numbers that happen to be integer or rational (e.g., $0.125_{10} \equiv 0.001_2$ in a binary floating-point system), or fixed-precision decimals such as Binary-Coded Decimal (BCD) values can be discrete values. In some examples, discrete values can be stored in database columns having SQL types such as, e.g., CHARACTER, VARCHAR, BINARY, BOOLEAN, INTEGER, DECIMAL, DATE, or TIME (excluding fractional seconds). Further examples of discrete values can include Universal Product Codes (UPC) values, product or item names, entity names, postal addresses, phone numbers, email addresses, Uniform Resource Locators (URLs), or names of chemicals (e.g., in dose-response testing).

As used herein, a "measure value" is, e.g., a natural, integer, rational, real, or complex value that can be meaningfully added to other measure values in a particular column. Examples of measure values can include a count of products sold, a cost per product, a monetary amount, e.g., of total sales, a distance, a time interval such as the time required for a particular step in a manufacturing processes, expressed in, e.g., seconds, or a value indicating drug efficacy, e.g., a half maximal inhibitory concentration (IC50) or half maximal effective concentration (EC50). In some examples, range tests can be performed on columns with measure values (e.g., floating-point numbers. Measure values can be stored with SQL types such as, e.g., FLOAT and REAL.

As used herein, a "predicate" (or "test," and likewise throughout this document) is a formula or algorithm that can be applied to a value to provide a Boolean result. If the result is True, the value is considered to "satisfy" the predicate. In this document, a predicate testing a condition c is denoted P{c}, and a predicate applied to a value v is denoted P{c}(v). For example, P{v>1}(2) is True because 2>1. Predicates can be applied to discrete values or measure values. Predicates can include logical connectives such as conjunction (AND or ∧), disjunction (OR or ∨), or negation (NOT or ¬). Predicates can include logical combinations of other predicates, e.g., $P_1 = P_2{}^{\wedge}P_3$. The notation P{c}{K}, as used herein, refers to the set of results from applying predicate P{c} to each value in column K. The notation P{K=i}≡P{v=i}(K) is shorthand for the predicate testing whether the value of column K in a data record is equal to i. For clarity, some references herein to fields within records are presented using dotted notation, e.g., "Record_Name.Field_Name". As used herein, an "equality predicate" or "equi-constraint" is a predicate testing only equality, e.g., P{v=i} or P{v≠i} for some i. An equality predicate can include one or more terms, e.g., $P\{V_1=i \wedge V_2=j\}$ for values i and j.

In some examples, a sampling module 308, which can represent sampling module 224, can be configured to determine at least one subset 310 of the data set. e.g., of the data record(s) 306. The at least one subset 310 can include, e.g., a first subset, a second subset, or any number of subsets, e.g., one subset per measure column. For clarity of explanation, subsets 310 are described herein as, e.g., "including" or "containing" data records 306. However, these terms do not require that a subset 310 physically include or incorporate one or more data records 306. In some examples, a subset 310 can include an area of computer-readable memory that physically or logically includes copies of (or the sole or master copies of) at least some of the data of at least some of the included data records 306. In some examples, a subset 310 can include references to, or information identifying, at least some of the included data records 306. In some examples, a subset 310 can include copies of some data records 306 (or portions thereof) and references to other data records 306 (or portions thereof). The examples in this paragraph also apply to other subsets described herein, such as predicate-associated subsets 312, discussed below.

In some examples, a subset 310 includes data records 306 selected from a data set based at least in part on respective measure values of the data records. In some examples, the sampling module 308 can determine the at least one subset 310 by selecting data records 306 from a data set based at least in part on respective measure values of the data records 306. For example, data records 306 can be selected at random from the data set to form a subset 310, and each data record 306 can be selected with probability proportional to the measure value in that data record 306. Examples are discussed herein, e.g., with reference to block 402, FIG. 4. In some examples, the sampling module 308 can determine the at least one subset 310 by selecting data records 306 from a data set using uniform selection probabilities, e.g., for COUNT queries.

In some examples, the sampling module 308 can be configured to determine at least one predicate-associated subset 312 of the data set. The predicate-associated subset 312 can include data records selected from the data set based on satisfying a predetermined predicate of the predicate-associated subset 312. The sampling module 308 can be configured to determine multiple predicate-associated subsets 312 for respective, different predicates. Examples are discussed herein, e.g., with reference to FIG. 4, 5 or 11.

In some examples, an indexing module 314, which can represent indexing module 226, can be configured to determine at least one index 316. The index 316 can store a mapping from a predicate to one or more data records of the data set that satisfy the predicate. The index 316 can additionally or alternatively store approximation values associated with the indexed data records. Examples are discussed herein, e.g., with reference to FIG. 4, 6, or 12.

The reception module 304, the sampling module 308, or the indexing module 314 can store in database(s) 318, which can represent database(s) 220, at least some of the data record(s) 306, at least some of the subset(s) 310, at least some of the predicate-associated subset(s) 312, or at least some of the index(es) 316. In some examples, fewer than all of any of those can be stored. In some examples, at least one of those can be omitted from database 318. For example, database 318 can include subset(s) 310 and predicate-associated subset(s) 312 but not index(es) 316, subset(s) 310 and index(es) 316 but not predicate-associated subset(s) 312, or predicate-associated subset(s) 312 and index(es) 316 but not subset(s) 310. In some examples, subset(s) 310 and index(es) 316 can be produced and stored in the database(s) 318, and predicate-associated subset(s) 312 can be omitted from database(s) 318. This can permit saving disk space while still providing approximate results with determined error bounds. In some examples, operations of components in group 320 can be repeated one or more times, e.g., to process multiple data records 306 and load database(s) 318 accordingly. Examples are discussed below, e.g., with reference to FIG. 4, 5, 11, or 12. In some examples, the reception module 304 can store part or all of a data record 306 in the database 318, e.g., using an SQL (Structured Query Language) INSERT statement. In some examples, the reception module 304 can receive a plurality of data records 306, e.g., data records 306 of a data set, and store part or all of at least one of the data records 306 in the database 318.

In some examples, the reception module 304 can be configured to receive a query 322 via communications interface 302. For example, query 322 can include, but is not limited to, audio, text, or other data, e.g., of a user query. Query 322 can include, e.g., an SQL query or XPath query. For example, communications interface 302 can receive at least some of the query 322 in the form of a Hypertext Transfer Protocol (HITP) request or other data sequence transmitted via a Transmission Control Protocol (TCP) connection. In some examples omitted for brevity, query 322 can be retrieved from computer-readable media 214 instead of or in addition to being received via communications interface 302. In some examples, query 322 can be associated with a user, e.g., entity 110. For example, a query 322 including an HITP request can include a URL parameter, HTTP cookie, or other identifying information associated with the entity 110. A query 322 including an SQL query can include a username associated with the entity 110.

A querying module 324, which can represent querying module 230, can process the query against database 318 to determine at least a query result 326 corresponding to query 322. For example, given the SQL query "SELECT COUNT (*) FROM EXAMPLE WHERE DV2=1", the querying module 324 can provide result 326 of 10, the count of data records 306 #91-#100, which match the "WHERE" condition. Examples of query operation are described herein with reference to FIGS. 4-10. In some examples, result 326 can include text of or representing a response to the query 322. A result 326 can include multiple fields of data. For example, a result 326 corresponding to a query aggregating both revenue and profit by store can include columns for store ID, aggregate revenue for that store, and aggregate profit for that store. A result 326 can include information to be presented to entity 110, e.g., a direct answer to a user query 322. For example, in an interactive query system, the result 326 can be provided to entity 110 in the form of a numeric output, a pie chart, a plot, or another visual, audible, or tactile (e.g., Braille) representation.

In some examples, the querying module 324 can be further configured to determine an accuracy value 328. The accuracy value 328 can indicate, e.g., the difference between an approximate aggregate value included in result 326 and an actual aggregate value associated with query 322. The accuracy value 328 can be determined, e.g., as a Euclidean distance, mean-squared error, confidence interval, or other value. Examples are discussed below, and also, e.g., with reference to decision block 408 or block 606.

In some examples, the querying module 324 can be configured to determine whether or not the accuracy value 328 satisfies a predetermined accuracy criterion. If not, the querying module 324 can process the query 322 in a different way, e.g., in an attempt to determine a result 326 associated with an accuracy value 328 satisfying the criterion. In some examples, the querying module 324 is configured to process the query using the subset(s) 310. If the accuracy value 328 does not satisfy the predetermined accuracy criterion, the querying module 324 can process the query 322 using the predicate-associated subset(s) 312 or the index(es) 316, in some examples.

In the example of Table 1, given the query 322 "SELECT DV1, SUM(MV1) FROM EXAMPLE GROUP BY DV1", the exact answer is 190 for DV1=0 and 298 for DV1=1. This can be expressed as the set of tuples {(0,190), (1,298)}. A distribution can be determined by dividing each sum by the grand total of 488=190+298, resulting in the distribution (190/488, 298/488)=(0.39, 0.61). In some examples, an approximate answer can be determined, e.g., corresponding to a distribution of (0.30, 0.70). The accuracy value 328 can be determined as the Euclidean distance between the distributions, taken as points in a measure space, e.g., as in Eq. (1):

$$\mathcal{D} = \|x - \hat{x}\|_2 = \sqrt{\sum_{i=1}^{r} (x_i - \hat{x}_i)^2} \qquad (1)$$

where $x=(x_1, \ldots, x_r)$ is an exact distribution and $\hat{x}=(\hat{x}_1, \ldots, \hat{x}_r)$ is an approximate distribution. The distance $\mathcal{D}$ can be an accuracy value 328, in some examples.

In some examples, the accuracy value 328 can be determined as a "support" of a predicate or query, e.g., a number of data records that satisfy the predicate or that were used in determining the result 326 for the query 322. In an example using the query above for SUM(MV1), the sampling module 308 can determine a subset 310 including data records 306 selected based on the values in the MV1 column of the various data records 306, e.g., as discussed herein with reference to block 402, FIG. 4. Since the query 322 includes an aggregate on the MV1 column, the querying module 324 can process the query 322 against the subset 310. The accuracy value can be the number of data records 306 satisfying the predicate. The example query 322 above does not have a WHERE clause specifying specific predicates, so the support would be the number of data records 306 in the subset 310. In an example query 322 "SELECT SUM(MV1) FROM EXAMPLE WHERE DV2=1" against the data in Table 1, the support size would be at most 19, since only 10 data records 306 (#91-#100) satisfy the condition DV2=1.

In some examples, the predetermined accuracy criterion can include a threshold support value. For example, the threshold support value can be $1/\epsilon^2$, $2/\epsilon^2$, or $\sqrt{n}/\epsilon^2$ for a maximum permitted distance $\epsilon$ determined, e.g., as in Eq. (1) and a table of n rows. In some examples, the querying module 324 can execute the query against at least one subset 310. If the support (indicated by the accuracy value 328) is less than the threshold support value, the querying module 324 can determine that the accuracy value 328 does not satisfy the accuracy criterion (alternatively, a less-than-or-equal test can be used). The querying module 324 can, in response, process the query against the predicate-associated subset(s) 312, the index(es) 316, or a combination thereof, to provide the query result 326.

In some examples discussed herein, the threshold support value can be selected as $1/\epsilon^2$ for a distance error bound $\epsilon$. In some of these examples, given an error rate $\delta$, when a query is processed as described herein, $\mathcal{D} < \epsilon$ with probability $1-\delta$. In some examples, the threshold support value can be selected as $(1/\epsilon^2) \log(1/\delta)$ (or 2 or $\sqrt{n}$ the numerator instead of 1). In some examples, $\epsilon$ can be substantially one of the following: 0.025, 0.05, 0.075, or 0.01.

In some examples, a transmission module 330, which can represent transmission module 236, can transmit an indication of the query result 326 via the communications interface 302. For example, the transmission module 330 can transmit the indication to computing device 104, FIG. 1. In some examples, the transmission module 330 can additionally or alternatively provide an indication of the accuracy value 328. In some examples, the querying module 324 can determine the accuracy value 328 based at least in part on the support of a query, and use the accuracy value 328 to determine whether to process the query against a subset 312 or index 316. This can permit providing a query results that meets at least a baseline or threshold level of accuracy. The transmission module 330 can transmit an indication of the accuracy value 328 to inform entity 110, e.g., a user, which strategy was used to provide the query result.

In some examples, operations of components in group 332 can be repeated one or more times, e.g., to process multiple queries 322 and provide corresponding results 326. Examples are discussed below with reference to FIGS. 4-10.

Illustrative Processes

Figure 4:
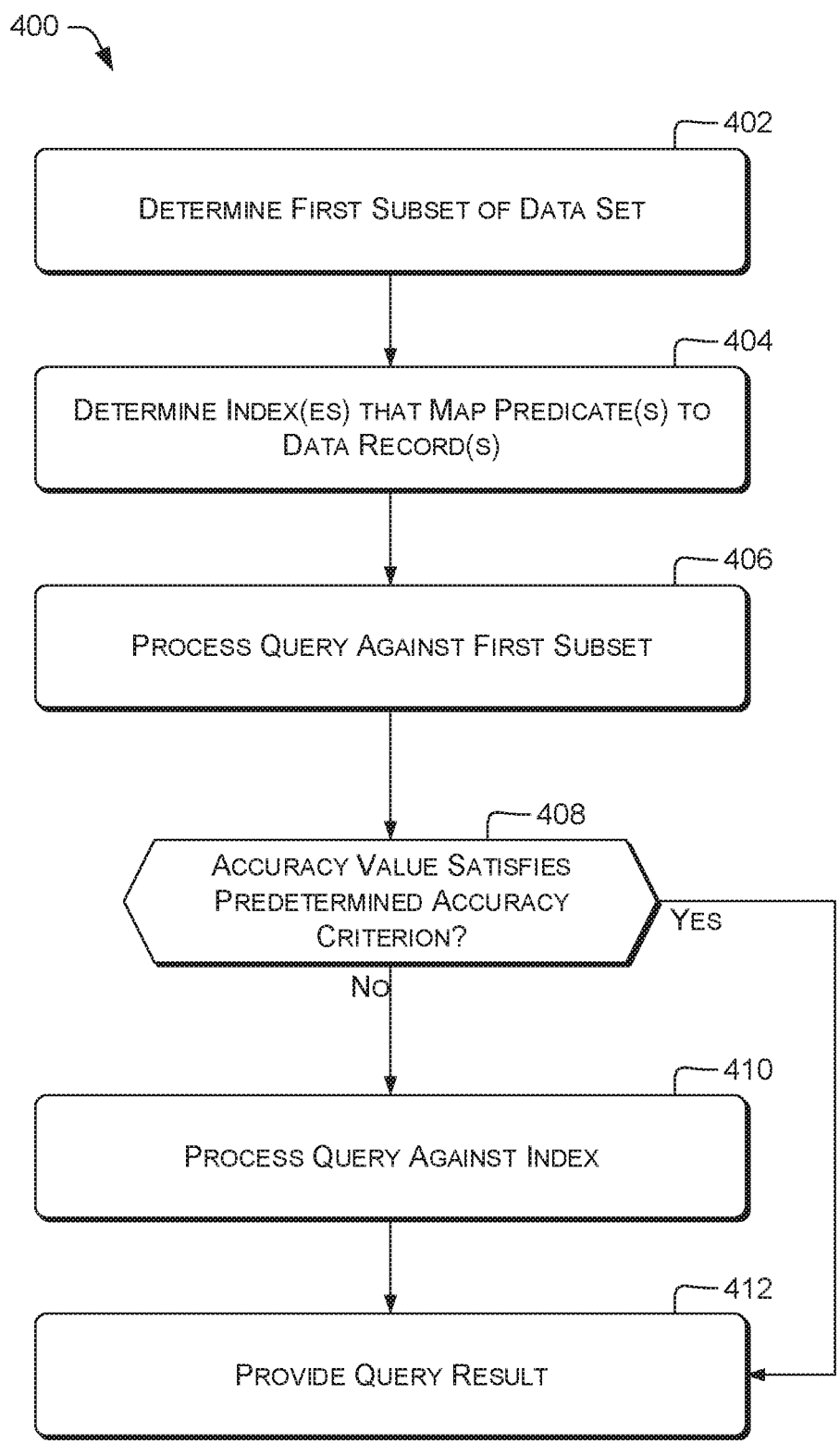
FIG. 4 is a flow diagram that illustrates example processes for building databases or processing queries according to various examples described herein.

FIG. 4 is a flow diagram that illustrates an example process 400 for building databases or processing queries. Example functions shown in FIG. 4 and other flow diagrams and example processes herein can be implemented on and/or otherwise embodied in one or more computing device(s) 102 and/or 104, e.g., a computing device 200, e.g., using software running on such device(s). For the sake of illustration, the example process 400 is described below with reference to processing unit 210 and other components of computing device 200, FIG. 2, that can carry out and/or participate in the steps of the exemplary method. However, other processing unit(s) such as processing unit 114 and/or other components of computing device(s) 102 and/or 104 can carry out step(s) of described example processes such as process 400. Similarly, exemplary method(s) shown in FIGS. 5-12 are also not limited to being carried out by any specifically-identified components.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 4-12 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions.

In some examples, at block 402, a first subset 310 of a data set can be determined. The first subset 310 can include first data records 306 selected from the data set based at least in part on respective measure values of the first data records 306. Examples are discussed above, e.g., with reference to sampling module 224. In some examples, for a desired distance threshold E between approximate and exact distributions, e.g., as in Eq. (1), the number of the first data records 306 can be at least $1/\epsilon^2$, as discussed above.

In some examples, the first data records 306 can be selected using a measure-biased sampling process defined with respect to a particular column. For example, first data records 306 can be selected ("drawn") at random from the data set, with replacement. The probability that any particular data record 306 is selected can be, e.g., proportional to or positively correlated with a particular measure value in that column. In the example of Table 1, for a first subset 310 based on column MV1, the sum of MV1 values in the entire table is 488. Therefore, the probability that each data record 306 is selected can be that data record's MV1 value divided by 488. For example, for each random draw, each of data records 306 #1-#90 and #101-#198 has a 1/488≈0.002 chance of being selected, each of data records 306 #91-#100 has a 10/488≈0.02 chance of being selected, and each of data records 306 #199-#200 has a 100/488≈0.2 chance of being selected.

In the example of Table 1, for a first subset 310 based on column MV2 instead of on column MV1, the sum of MV1 values in the entire table is ~701.95. Therefore, data record 306 #1 has a ~3.14159/710.95≈0.0044 probability of being selected, and data record 306 #100 has a ~8.3279/710.95≈0.012 probability of being selected, for example. Further examples of selection are discussed below with reference to, e.g., FIG. 4, 6, 9, 11, or 12, or the Illustrative Results section.

An example will now be discussed of drawing a first subset 310 based on EXAMPLE.MV1 shown in Table 1. The sum of MV1 values is 488, which can be determined in one sequential pass over Table 1. The number m of data records 306 in the first subset 310 can be determined to be 20. e.g., corresponding to a distance threshold ϵ≈0.25 and an error rate δ≈0.05. A set of m random numbers can then be selected from a uniform distribution on [0,488), e.g., {0, 25, 50, ..., 450, 475}. A second sequential pass (for example) can then be made over Table 1, and a running sum of MV1 values in the preceding records kept, starting from 0. E.g., when processing data record 306 #3, the running sum is 2, the sum of #1.MV1 and #2.MV1. Each data record 306 encountered can be added to the first subset 310 as many times as the count of the random numbers that are at least the running sum, and less than the sum of the measure value of the data record 306 and the running sum. For example, when processing data record 306 #26, the running sum is 25 and the running sum added to #26.MV1 is 26. One of the random numbers is on the range [25, 26), so one copy of data record 306 #26 is added to the first subset 310. When processing data record 306 #199, the running sum is 288 ($\Sigma_{i=1}^{198}$# i.MV1) and the sum is 388 ($\Sigma_{i=1}^{198}$# i.MV1+#199.MV1). Four of the random numbers are in the range [288,388), namely {300,325,350,375}, so four copies of data record 306 #199 are added to the first subset 310. This example technique can permit determining a first subset 310 (or other subsets, e.g., a subset including selected data records 616, FIG. 6) using two sequential passes over the dataset and no random seeks. Other techniques for selecting records can additionally or alternatively be used.

In some examples, at block 404, an index 316 can be determined. The index 316 can include a mapping from a predicate to one or more second data records 306 of the data set associated with the predicate. The index 316 can include, e.g., respective identifiers of the one or more second data records 306. In the example of Table 1, the index 316 can correspond, e.g., to the predicate P{DV1=1}, that is, some or all data record(s) for which DV1=1. In this example, the index 316 can include the IDs 101-200, identifying the records for which DV1=1. This can permit readily determining which data records 306 satisfy the predicate should the predicate occur in a query. The index 316 can be stored, e.g., using a B+ tree (e.g., for columns with measure values), conventional inverted index, trie, hash table, or other inverted-index data structure (e.g., applicable to the respective type of column).

In some examples, the index 316 can include a mapping from the predicate to respective approximation values associated with the one or more second data records 306. For example, the index 316 can include the approximation values in association with the identifiers of the respective second data records 306. The index 316 can include a respective approximation value, e.g., for at least one measure value in a second data record 306. In some examples, the index 316 can include a ρ×μ table (or equivalent structure) including the approximation value for the $m^{th}$ measure value in the $r^{th}$ data record 306, m∈[1,μ] and r∈[1,ρ]. Individual approximation values can include, e.g., rounded values, binned values, orders of magnitude, or other approximations.

Table 2 shows an example index 316 for the data in Table 1 and the predicate P{DV4=1}. In the example of Table 2, the approximation a of a value v is the binary order of magnitude of v, i.e., $\lfloor \log_2 v \rfloor$, so that $2^a \leq v \leq 2^{a+1}$. In some examples, other logarithm bases can be used. Storing approximations as the value of an exponent can reduce the number of bits required for storing each approximation, saving disk and RAM space and increasing throughput by reducing the probability of cache misses. However, these examples are not limiting. In some examples, the measure value(s) are stored in the index 316 instead of or in addition to the approximation values. For example, in a data set having, e.g., a small number of measure columns, storing exact values can permit increasing the accuracy of query results. Other examples of approximations are discussed below with reference to Table 3.

TABLE 2

Index for Table 1, DV4 = 1

| Data Record ID | MV1 Approximation | MV2 Approximation |
|---|---|---|
| 1 | 0 | 1 |
| 90 | 0 | 3 |
| 91 | 3 | 1 |
| 100 | 3 | 3 |
| 101 | 0 | 2 |
| 198 | 0 | 2 |
| 199 | 6 | 1 |
| 200 | 6 | 2 |

In some examples, at block 406, a query 322 can be processed against the first subset 310 to provide a first result, e.g., query result 326, and a first accuracy value 328. Examples are discussed above, e.g., with reference to querying module 230. For example, the data records 306 of the first subset 310 can be processed, e.g., sequentially in one pass. Each data record 306 can be tested to determine whether it satisfies the query 322, e.g., whether the discrete values in the data record 306 satisfy predicate(s) of the query 322. A data record 306 that does satisfy the query 322 can be output or saved, e.g., for grouping or aggregation. A support value can be initialized to zero and incremented for each data record 306 satisfying the query to determine the support of the first query result 326. The first query result 326 can be determined while traversing the first subset 310, e.g., for SUM or COUNT aggregates, or can be determined after all rows have been traversed, e.g., for STDEV aggregates.

In some examples, an index (e.g., as discussed herein with reference to FIG. 12) can include approximation values such as discussed herein with reference to FIG. 2. For example, the approximation values can be determined and store in branching nodes of a B+ tree or other search tree. The approximation values can then be used while searching the tree to determine nodes likely satisfying a range predicate (e.g., P{MV1>42}) expressed in terms of approximation values (e.g., P{approximation of MV1>5} for an approximation of $\log_2$(value)). Approximation values in the index can additionally or alternatively be used to satisfy more complex criteria, e.g., range predicates such as P{1337≤MV1≤1708}≡P{MV1≥1337∧MV1≤1708}.

In some examples, at decision block 408, it can be determined whether the first accuracy value 328 satisfies a predetermined accuracy criterion. Examples are discussed above, e.g., with reference to accuracy value 328, FIG. 3. For example, if the support of the first query result 326 is not at least $1/\epsilon^2$, decision block 408 can determine that the first accuracy value 328 does not satisfy the predetermined accuracy criterion. In this situation, decision block 408 can be followed by block 410. If the first accuracy value 328 does satisfy the predetermined accuracy criterion, decision block 408 can be followed by block 412.

In some examples, at block 410, the query 322 can be processed against the index 316 to provide a second result, e.g., a second query result 326. Examples are discussed herein, e.g., with reference to FIG. 6. In some examples, the second query result 326 can be provided, e.g., as discussed above with reference to transmission module 236.

In some examples, at block 412, the query result 326 can be provided. For example, the query result 326 can be displayed or transmitted, e.g., as discussed above with reference to transmission module 236. In some examples, the query result 326 can be provided to an entity 110, e.g., a user or other human, or to a computing system or other automated receiver of the query result 326.

In some examples, block 402 can be followed by block 406. In some examples, block 404 can be followed by block 410. In some examples, block 406 can be performed before block 404, so that the index 316 is determined only if necessary to satisfy the predetermined accuracy criterion. In some examples, blocks 402 and 404 can be performed offline, e.g., as part of a preparation or data-ingestion operation. In some examples, blocks 406-412 can be performed online, e.g., as part of an interactive data-exploration system.

In some examples, techniques described herein can be used for measure values that are non-negative. In some examples, sub-columns can be determined of a measure column, e.g., during a preprocessing step or a sequential pass. One sub-column can include non-negative (or positive) values from the measure column and a separate sub-column can include the absolute values of the negative (or nonpositive) values. For example, given the column MV3={3, −1, 4, −1, 5, 9, −2, −6}, the sub-columns MV3nonneg={3, NULL, 4, NULL, 5, 9, NULL, NULL} and MV3neg={NULL, 1, NULL, 1, NULL, NULL, 2, 6} can be determined. In some examples, the subset(s) 310, predicate-associated subset(s) 312, or index(es) 316 can include or be determined based at least in part on the sub-columns instead of or in addition to the measure column. Sub-queries can then be determined of query 322, e.g., by breaking ranges into nonnegative (or positive) and negative (or nonpositive) subranges and processing each subrange against a sub-column as described herein, or by negating the output values in a sub-query to be applied to a negative (or non-positive) sub-column. Approximate values can then be determined by combining the results of the sub-queries. For example, the query SUM(MV3) has the exact answer 11. Sub-queries SUM(MV3nonneg) and −SUM(MV3neg) have the respective exact answers 21 and −10, and SUM(MV3)=SUM (MV3nonneg)+−SUM(MV3neg)=11.

In some examples permitting negative measure values, instead of or in addition to determining subcolumns, biased column(s) can be determined for respective measure column(s) by adding a predetermined value to each measure value. For example, with a bias value of 10, MV3bias={13, 9, 14, 9, 15, 19, 8, 4}. Indexing and queries can then be performed against the bias column(s) instead of or in addition to against the measure columns. The results can be adjusted at the end of the query. For example, in a SUM query, the resulting sum can be reduced by the bias value times the number of rows included in the sum. For example, SUM(MV3)=SUM(MV3bias)−10×|MV3bias|=91−10×8.

In some examples, techniques described herein can be used for computing COUNT or SUM aggregates. In some examples, techniques described herein can be used for computing other aggregates, e.g., COUNT DISTINCT, AVERAGE, or STDEV. For example, AVERAGE can be determined by querying COUNT and SUM in parallel, e.g., during a single pass through a set of data records 306, and dividing the sum by the count. In some examples, during processing of a query, data records 306 satisfying the query can be stored or noted in a result set, as well as their probabilities of selection. After selecting data records 306, e.g., from a subset 310 or predicate-associated subset 312, or based on an index 316, the data records 306 of the result set, or the probabilities of selection of the data records 306 of the result set, can be provided to an aggregation function to compute the result of the aggregate. For example, in blocks 406, 410, 504, 602, 614, 702, 708, 806, 902, or 1006, data records 306 can be noted in a result set and an aggregate computed after the result set has been populated using an aggregation function. In some examples, an aggregation-update function can be called iteratively as each data record 306 is selected, and a consolidation function can be called after all data records 306 have been selected, e.g., as in the example of a JAVA DERBY user-defined aggregator having "accumulate" (update) and "merge" (consolidation) functions.

Figure 5:
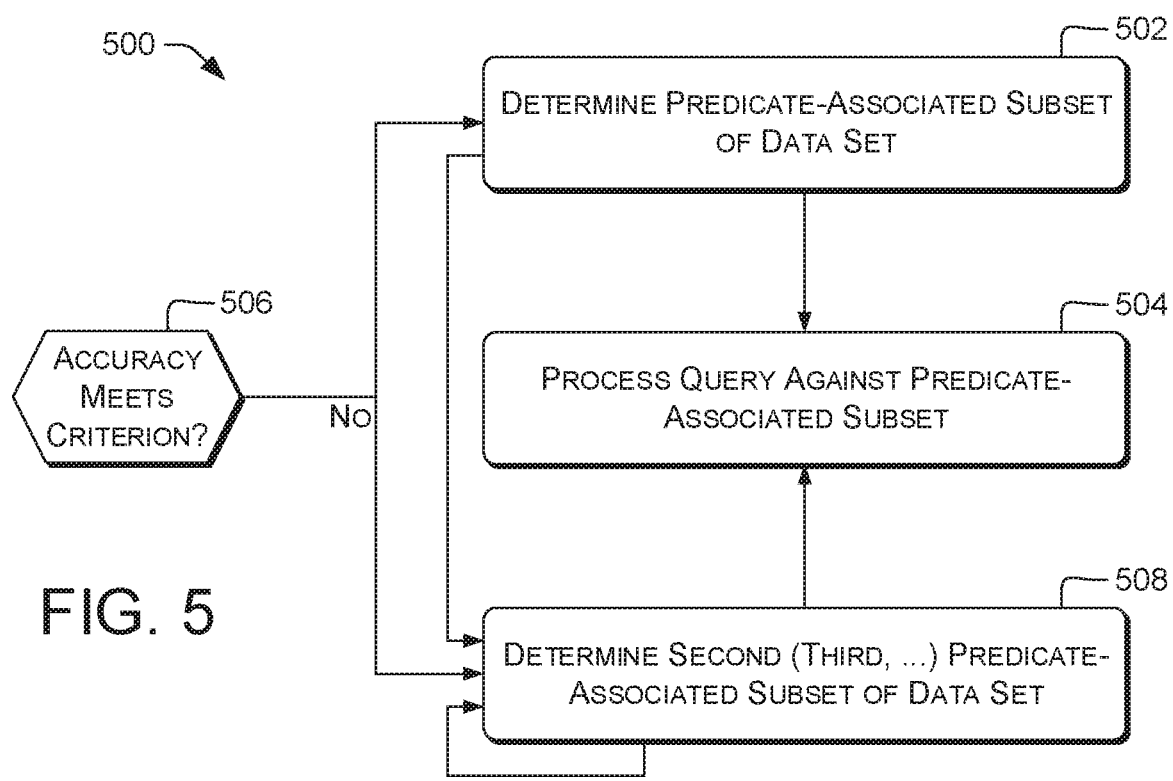
FIG. 5 is a flow diagram that illustrates example processes for building databases or processing queries according to various examples described herein.

FIG. 5 is a flow diagram that illustrates an example process 500 for building databases or processing queries.

In some examples, at block 502, a predicate-associated subset 312 of the data set can be determined. Examples are discussed above, e.g., with reference to sampling module 224, FIG. 3. The predicate-associated subset 312 can include third data records 306 selected from the data set. Individual data records 306, e.g., all data records 306, of the third data records 306 can satisfy a predetermined predicate of the predicate-associated subset 312. In some examples, the predicate-associated subset 312 can include materialized query results against a table or other portion or entirety of the data set for records satisfying the predicate. Some or all of the records satisfying the predicate can be included. Materializing such query results can permit rapidly retrieving data records 306 satisfying the predicate without requiring further query operations. In some examples, the third data records 306 can be stored sequentially in a computer-readable memory, e.g., RAM, disk, or Flash, in some examples. Storing the third data records 306 of the predicate-associated subset 312 sequentially can permit rapidly scanning the third data records 306 to locate record(s) of the third data records 306 satisfying additional predicates not used in determining the third data records 306.

In some examples, at block 504, the query 322 can be processed against the predicate-associated subset 312. Examples are discussed above, e.g., with reference to the querying module 230, FIG. 3. For example, the third data records 306 can be sequentially or otherwise scanned, and each record in turn tested against the query 322.

In some examples using multiple predicate-associated subsets 312, e.g., as discussed below with reference to block 508, block 502 or block 504 can include selecting a predicate-associated subset 312 for use in processing the query 322. In some examples, block 502 (or other blocks carried out, e.g., by the sampling module 224) can include storing a mapping from predicates to respective predicate-associated subsets 312 and respective data record 306 counts in those predicate-associated subsets 312. In some examples, the mapping can be stored in or associated with an index 316, e.g., as discussed herein with reference to blocks 404 or 410 or FIG. 6. Block 502 or 504 can include determining a plurality of predicates in the query 322, retrieving respective data record 306 counts for the predicates from the mapping, and selecting the predicate having, e.g., the lowest data record 306 count. Block 504 can then include processing the query against the predicate-associated subset 312 corresponding to the selected predicate. Selecting the predicate having the lowest data record 306 count can increase query speed by reducing the number of data records 306 to be tested against predicates of the query other than the selected predicate.

In some examples, decision block 506, which can represent decision block 408, can be followed by block 502 if the first accuracy value 328 does not satisfy the predetermined accuracy criterion, as discussed above. In this way, the query 322 can be processed against the predicate-associated subset, e.g., by the querying module 230, in response to the determining that the first accuracy value 328 does not satisfy the predetermined accuracy criterion.

In some examples, block 502 or decision block 506 can be followed by block 508.

In some examples, at block 508, a second predicate-associated subset 312 of the data set can be determined including fourth data records 306 selected from the data set. Examples are discussed above, e.g., with reference to the sampling module 224. In some examples, block 508 can be followed by block 504, in which the query 322 can be processed against the second predicate-associated subset 312. In some examples, block 508 can further include determining any number of additional predicate-associated subsets 312, e.g., for respective, different predicates. In the example of Table 1, blocks 502 and 508 can, between them, determine predicate-associated subsets 312 for predicates P{DV2=1} (10 data records 306). P{DV3=1} (1 data record 306), and P{DV4=1} (8 data records 306). In some examples, an individual predicate-associated subset 312 can be associated with equality predicates, e.g., of the form P{DVx=y}, range predicates, e.g., of the form P{MVz<w}, or combinations of predicates, e.g., of the forms P{DVx=y ∧ DVz=w} or P{DVx=y∧ MVz>w}. These example forms are not limiting.

In some examples, the sampling module 224 is configured to select the fourth data records 306, or the fourth data records 306 are otherwise selected, so that the fourth data records 306 satisfy a predetermined second predicate of the second predicate-associated subset 312. The second predicate can be, e.g., different from the predicate of the predicate-associated subset 312 determined at block 502. The predicate-associated subset 312 and the second predicate-associated subset 312 can have (e.g., can be selected to have) respective numbers of data records smaller than a predetermined threshold number.

In some examples, the predetermined threshold number is equal or substantially equal to $\sqrt{n}$, where n is the number of data records 306 in the data set, e.g., in a particular table in question. In the example of Table 1, n=200, so $\sqrt{n}\approx14$. Therefore, block 508 (or block 502) can include determining predicate-associated subsets 312 for predicates matching fewer than 14 data records 306, or 14 or fewer data records 306. For example, the predicate P{DV1=1} is satisfied by 100 data records 306 (#101-#200). Therefore, in some examples, a predicate-associated subset 312 is not determined based on P{DV1=1}. By contrast, the predicate P{DV2=1} is satisfied by only 10 data records 306 (#91-#100), so, in some examples, a predicate-associated subset 312 is determined based on P{DV2=1}. Determining a predicate-associated subset 312 for a predicate matching fewer data records 306 than the predetermined threshold number can permit increasing speed of query, e.g., by permitting sequential scanning, while maintaining acceptable storage consumption compared to materializing query results for predicates matching large numbers of data records 306 (e.g., P{DV3=0}).

In some examples, at least some of blocks 402, 404, 502, or 508 can be executed online, as data record(s) 306 become available. Additionally or alternatively, at least some of blocks 402, 404, 502, or 508 can be executed. e.g., in batch, covering, e.g., one day's or one week's worth of data records 306.

Figure 6:
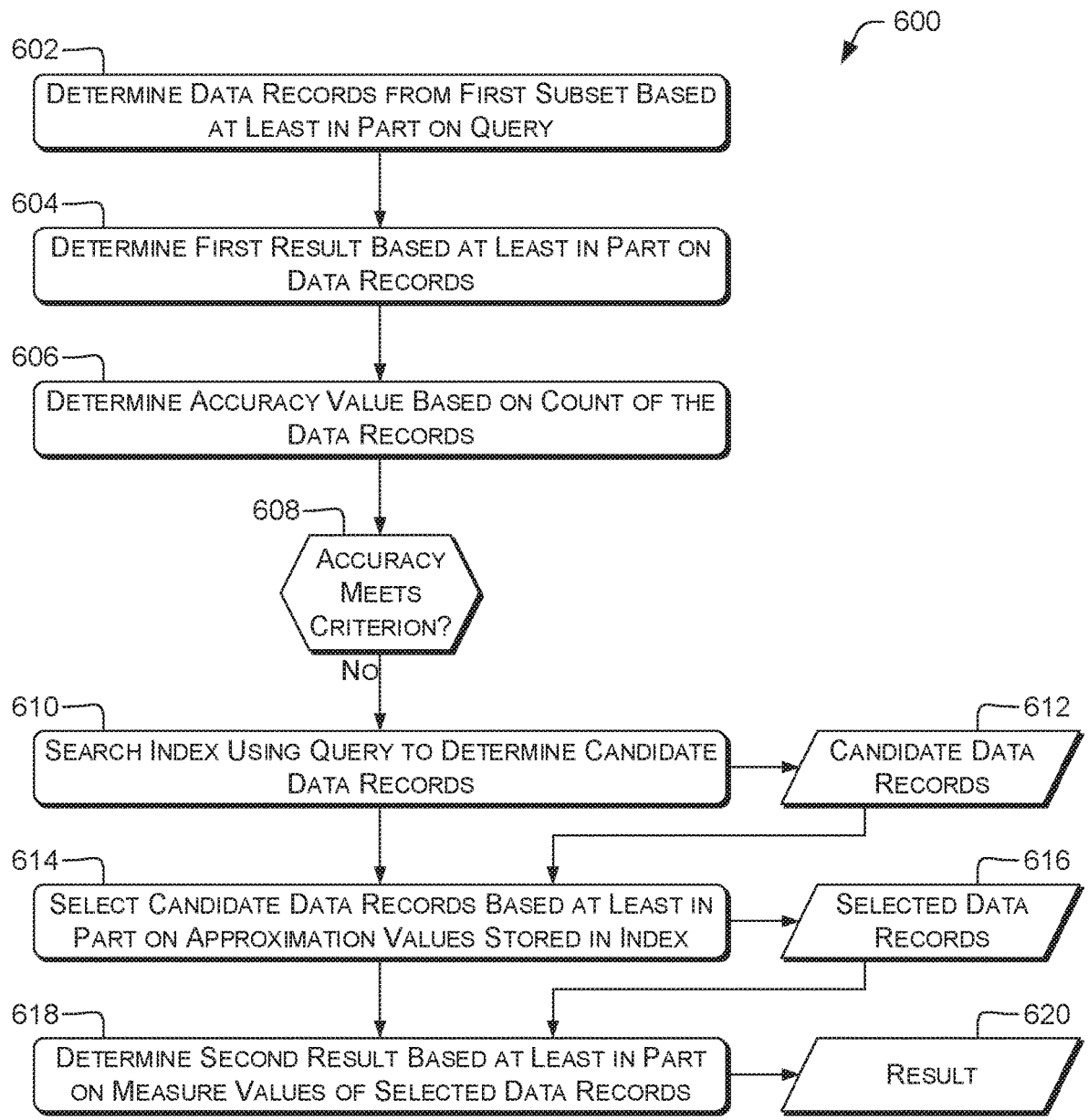
FIG. 6 is a dataflow diagram that illustrates example processes for processing queries, and example data items, according to various examples described herein.

FIG. 6 is a dataflow diagram that illustrates an example process 600 for processing queries, and example data items. Operations of process 600 can be carried out. e.g., by the querying module 230. In some examples, block 406 can include at least one of blocks 602-606. In some examples, decision block 408 can include decision block 608. In some examples, block 410 can include at least one of blocks 610-618. In some examples, blocks of FIGS. 5 and 6 can be used together. In some examples, e.g., to save disk space, blocks of FIG. 6 can be used without blocks from FIG. 5.

In some examples, at block 602, one or more data records 306 of the first subset 310 can be determined, e.g., selected from the first subset 310 based at least in part on the query 322. Each data record 306 of the one or more data records 306 can satisfy the query 322. Block 602 can include determining the results of the query 322, when the query 322 is applied to the first subset 310. Block 602 can be followed by block 604 or block 606.

In some examples, at block 604, the first result 326 can be determined based at least in part on the one or more data records 306. For example, GROUP BY clauses of the query 322 can be processed. In some examples, approximate answers can be determined for aggregates in the query 322, e.g., COUNT or SUM operations.

In some examples, at block 606, the first accuracy value 328 can be determined based on a count of the one or more data records. In some examples, if four data records 306 of the first subset 310 satisfy the query, block 606 can include determining that the first accuracy value 328 equals four. Examples are discussed above, e.g., with reference to FIG. 3 or 4.

In some examples, at decision block 608, which can represent decision block 408, it can be determined that the first accuracy value 328 does not satisfy the predetermined accuracy criterion. Examples are discussed above, e.g., with reference to FIG. 3 or 4.

In some examples, at block 610, the index 316 can be searched using the query 322 to determine candidate data records 612 of the data set. For example, as discussed above, the index 316 can include mapping(s) associated with one or more predicates. Block 610 can include retrieving from the index 316 identifiers or other indications of the candidate data records 612 satisfying each predicate in turn.

An example query against Table 1 is "SELECT DV1, SUM(MV1) FROM EXAMPLE WHERE DV1=1 AND DV4=1 GROUP BY DV1". This query includes two predicates: P{DV1=1} and P{DV4=}. At block 610, a first mapping, for P{DV1=1}, can be retrieved. The first mapping can indicate the IDs #101-#200. A second mapping, for P{DV4=1}, can be retrieved, e.g., before, after, or in parallel with retrieving the first mapping. The second mapping can indicate the IDs #1, 90, 91, 100, 101, 198, 199, and 200. The candidate data records 612 can then be determined. Since the logical connector in the example query is "AND", at block 610, the intersection of the first and second mapping can be computed to determine the candidate data records 612. In this example, the candidate data records are IDs #101, 198, 199, and 200.

The intersection can be computed, e.g., using set-intersection algorithms such as bitwise ANDing bit strings representing the mappings, sequentially traversing the sets in parallel to locate common elements, computing a bitwise AND of Bloom filters, hash-based intersections, or other techniques. Similar techniques can be used in computing other set operations corresponding to logical connectors between predicates in a query. For example, the query can include a structure of predicates and logical connectors forming an operator tree, and the operator tree can be evaluated using language-interpreter techniques with set-operation techniques used at each node.

In some examples, block 610 can additionally or alternatively include testing at least some of the approximation values of the index against a range predicate of the query. An example of such a query against Table 1 is "SELECT DV1, SUM(MV1) FROM EXAMPLE WHERE DV1=1 AND DV4=1 AND MV2>5 GROUP BY DV1". The predicates P{DV1=1} and P{DV4=1} ($\equiv$P{DV1=1$\wedge$DV4=1}) can be processed as discussed above, e.g., using mappings. Concurrently with processing of the mappings, or before or after processing the mappings, the querying module 324 can test the approximation values against the range predicate, e.g., P{MV2>5}. The querying module 324 can determine the first result based at least in part on rows that satisfy the range predicate, e.g., omitting rows that do not satisfy the range predicate.

Testing the approximation values against the range predicate can include determining an approximation predicate based at least in part on the range predicate and testing the approximation values against the approximation predicate. In the example index of Table 2, above, the MV2 approximation values apx(MV2)=$\lfloor \log_2 v \rfloor$. Therefore, the approximation predicate in this example is P{apx(MV2)>2}, corresponding to P{MV2>4}. All of the rows satisfying the range predicate P{MV2>5} will satisfy the approximation predicate P{apx(MV2)>2}$\equiv$P{MV2>4}. Therefore, selecting rows that satisfy the approximation predicate can permit determining the first result as an approximation of the exact result of the query.

In some examples, at block 614, a plurality of the candidate data records 612 can be selected based at least in part on the respective approximation values to provide selected data records 616. The candidate data records 612 can be drawn at random with replacement to provide the selected data records 616. In some examples, block 614 can include selecting the IDs of at least some of the selected data records 616 using the results from the search of index 316 at block 610. In some examples, block 614 can further include retrieving the selected data records 616 from the data set, e.g., by a random seek and a read of a disk storage of the data set. In some examples, the number of selected data records 616 can be at least the number of candidate data records 612, or a threshold support value (e.g., $1/\epsilon^2$ for a maximum permitted distance $\epsilon$ determined, e.g., as in Eq. (1)), or the larger of the number and the value, or the smaller of the number and the value.

In some examples, the probability of selection of a candidate data record 612 as a selected data record 616 can be proportional to the approximation value associated with that candidate data record 612. Examples of such selection are discussed above with reference to block 402, FIG. 4. Relevant data from Tables 1 and 2 are repeated in Table 3 for ease of reference. However, where Table 2 shows the approximation values as exponents of 2, namely [$\log_2 v$], Table 3 shows the approximations as powers of 2, namely $2^{\lfloor \log_2 v \rfloor}$, as discussed below.

TABLE 3

| ID | MV1 | MV1 Approx. | MV2 | MV2 Approx. |
|---|---|---|---|---|
| 101 | 1 | 1 | 5.0288 | 4 |
| 198 | 1 | 1 | 6.9399 | 4 |
| 199 | 100 | 64 | 3.7510 | 2 |
| 200 | 100 | 64 | 5.8209 | 4 |

In this example, for a query including an aggregate of MV1 (e.g., SUM(MV1)), in a particular random draw, the probability of selecting data record 306 #101 and the probability of selecting data record 306 #198 can each be $1/(1+1+64+64)=1/130\approx0.008$. The probability of selecting data record 306 #199 and the probability of selecting data record 306 #200 can each be $64/130\approx0.49$. For a query including an aggregate of MV2 (e.g., SUM(MV2)), the probability of selecting data record 306 #101, the probability of selecting data record 306 #198, and the probability of selecting data record 306 #200 can each be $4/(4+4+2+4)=4/18\approx0.22$. The probability of selecting data record 306 #199 can be $2/18\approx0.11$. Selecting candidate data records 612 to be the selected data records 616 based on probabilities correlated with the approximation values or the measure values can permit more accurately determining approximate answers to queries. In some examples, candidate data records 612 can be chosen as selected data records 616 using the two-pass technique described above with reference to first subset 310. These examples are not limiting. In some examples, e.g., for databases 220 supporting only a predetermined subset of aggregates in queries, the probability of selection of a candidate data record 612 as a selected data record 616 can be, e.g., uniform or otherwise predetermined.

In some examples, at block 618, the second result 620, which can represent a result 326, can be determined based at least in part on respective measure values of the selected data records 616. For example, GROUP BY clauses can be executed based on the contents of the selected data records 616, or aggregates can be computed based on the retrieved selected data records 616. In some examples, block 618 can include storing sets of the measure values, e.g., separated by GROUP BY clause parameters, and corresponding weights of the measure values, e.g., the probabilities of selecting the respective data records 306. Block 618 can then include determining the result 620 based at least in part on the sets and weights. In some examples, the determination of the sets and weights can be performed in parallel or interleaved with the determination of the selected data records 616 (block 614). Block 618 can then include determining the result 620 based on the already-determined sets and weights. This can reduce the number of seeks required to access the records of the selected data records 616, improving performance. In some examples, multiple subsets 310 can be determined based on respective, different sets of weights or techniques for determining weights, e.g., weights or techniques associated with specific types of aggregates. This can provide improved accuracy of approximations of those aggregates while providing rapid responses to queries.

Figure 7:
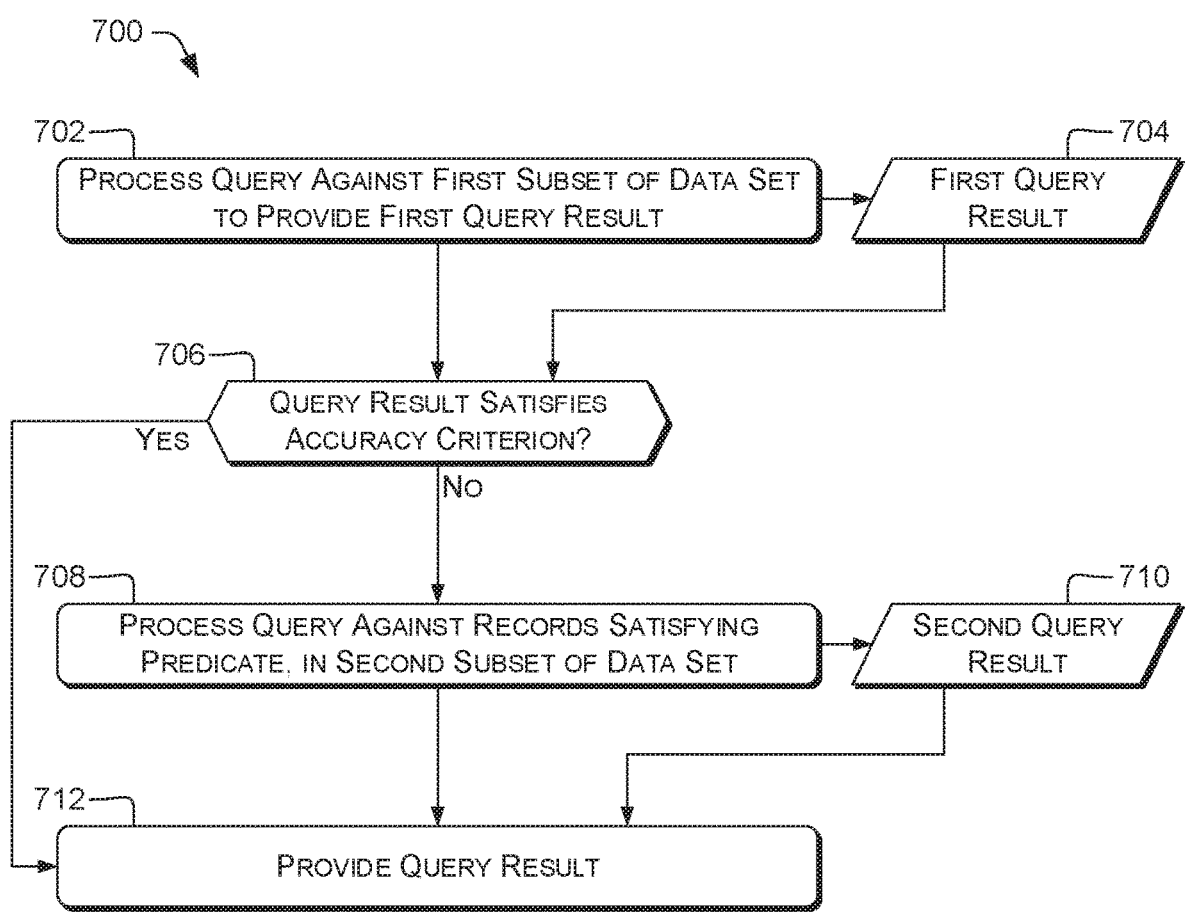
FIG. 7 is a dataflow diagram that illustrates example processes for processing queries, and example data items, according to various examples described herein.

FIG. 7 is a flow diagram that illustrates an example process 700 for processing queries, and example data items. Operations of process 700 can be carried out, e.g., by the querying module 230.

In some examples, at block 702, a query 322 can be processed against a first subset 310 of a data set to provide a first query result 704. The first subset 310 can include first data records 306 selected from the data set based at least in part on respective measure values of the first data records 306. Examples are discussed above, e.g., with reference to blocks 406 or 604.

In some examples, at decision block 706, it can be determined whether the first query result 704 satisfies a predetermined accuracy criterion, e.g., whether an accuracy value associated with the first query result 704 satisfies the predetermined accuracy criterion. If so, the next block can be block 712. If not, the next block can be block 708. Examples are discussed above, e.g., with reference to blocks 406, 506, 606, or 608.

In some examples, at block 708, the query 322 can be processed against a second subset of the data set, e.g., a predicate-associated subset 312, to provide a second query result 710. The second subset can include second data records 306 selected from the data set, wherein individual records 306 of the second data records 306 satisfy a predetermined predicate of the second subset. Examples are discussed above, e.g., with reference to FIG. 5.

In some examples, at block 712, the query result 326 can be provided. For example, the first query result 704 or the second query result 710 can be provided as the query result 326. Examples are discussed above, e.g., with reference to block 412.

Figure 8:
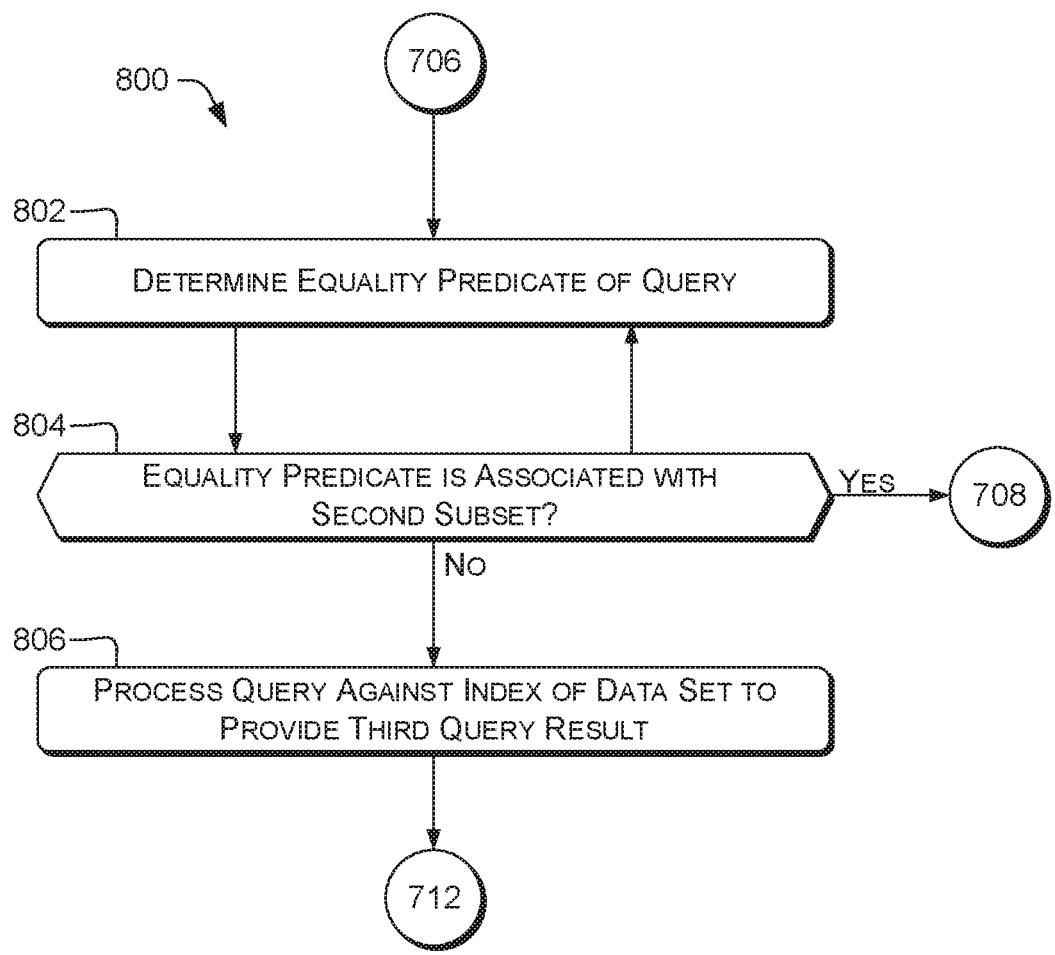
FIG. 8 is a flow diagram that illustrates an example process for processing queries according to various examples described herein.

FIG. 8 is a flow diagram that illustrates an example process 800 for processing queries. Operations of process 800 can be carried out, e.g., by the querying module 230. In some examples, decision block 706, FIG. 7, can be followed by block 802, e.g., if the query result does not satisfy the predetermined accuracy criterion.

In some examples, at block 802, an equality predicate of the query 322 can be determined. For example, parsing or tree-processing techniques can be used to process the query 322 to locate the equality predicate.

In some examples, at decision block 804, it can be determined whether the equality predicate is associated with the second subset. If so, it can be determined that the second subset is usable in processing the query 322. Therefore, decision block 804 can be followed by block 708. In this way, in response to the determining that the equality predicate is associated with the second subset, the query 322 can be processed against the second subset. If the equality predicate is not associated with the second subset, decision block 804 can be followed by block 806. In some examples, the second subset is or includes a predicate-associated subset 312.

In some examples, blocks 802 and 804 can be repeated to determine at least one predicate-associated subset 312 that can be used in processing the query. Examples are discussed above, e.g., with reference to block 504. For example, if the query 322 includes one or more equality predicates, block 708 can be used if at least one of the equality predicates is associated with a respective second subset. In some examples, at least one of block 802 or decision block 804 can include determining that the query 322 includes at least one predicate and that each and every predicate in the query is an equality predicate. In the example of Table 1, e.g., as discussed above with reference to block 508, a respective predicate-associated subset 312 can be determined for at least one of the predicates P{DV2=1}, P{DV3=1}, or P{DV4=1}. Block 708 can be used if the query 322 includes at least one of those three predicates for which a respective predicate-associated subset 312 has been determined.

In some examples, at block 806, e.g., in response to the determining (decision block 804) that the equality predicate is not associated with the second subset, the query 322 can be processed against an index 316 of the data set to provide a third query result. The index 316 can include a mapping from a predicate to at least one third data record of the data set associated with the predicate and to at least one respective approximation value associated with the at least one third data record. Examples of index 316 are discussed herein with reference to, e.g., indexing module 226, block 404, or FIG. 12. Examples of processing queries 322 against index 316 are discussed herein with reference to, e.g., querying module 230, block 410, or blocks 610-618. In some examples, block 806 can be followed by block 712, at which the third query result can be provided as the query result 326.

In some examples, block 806 can include filtering the data set by testing at least some approximation values of the index against a predicate of the query. The predicate of the query can include, e.g., at least one of an equality predicate or a range predicate. For example, as discussed herein with reference to block 610, block 806 can include selecting rows of the data set for which the approximation values listed in the index satisfy the predicate of the query, or an approximation predicate corresponding thereto. The third query result can then be determined based at least in part on the selected rows. Rows not satisfying the predicate of the query, or the corresponding approximation query, can be disregarded in determining the third query result, in some examples.

Figure 9:
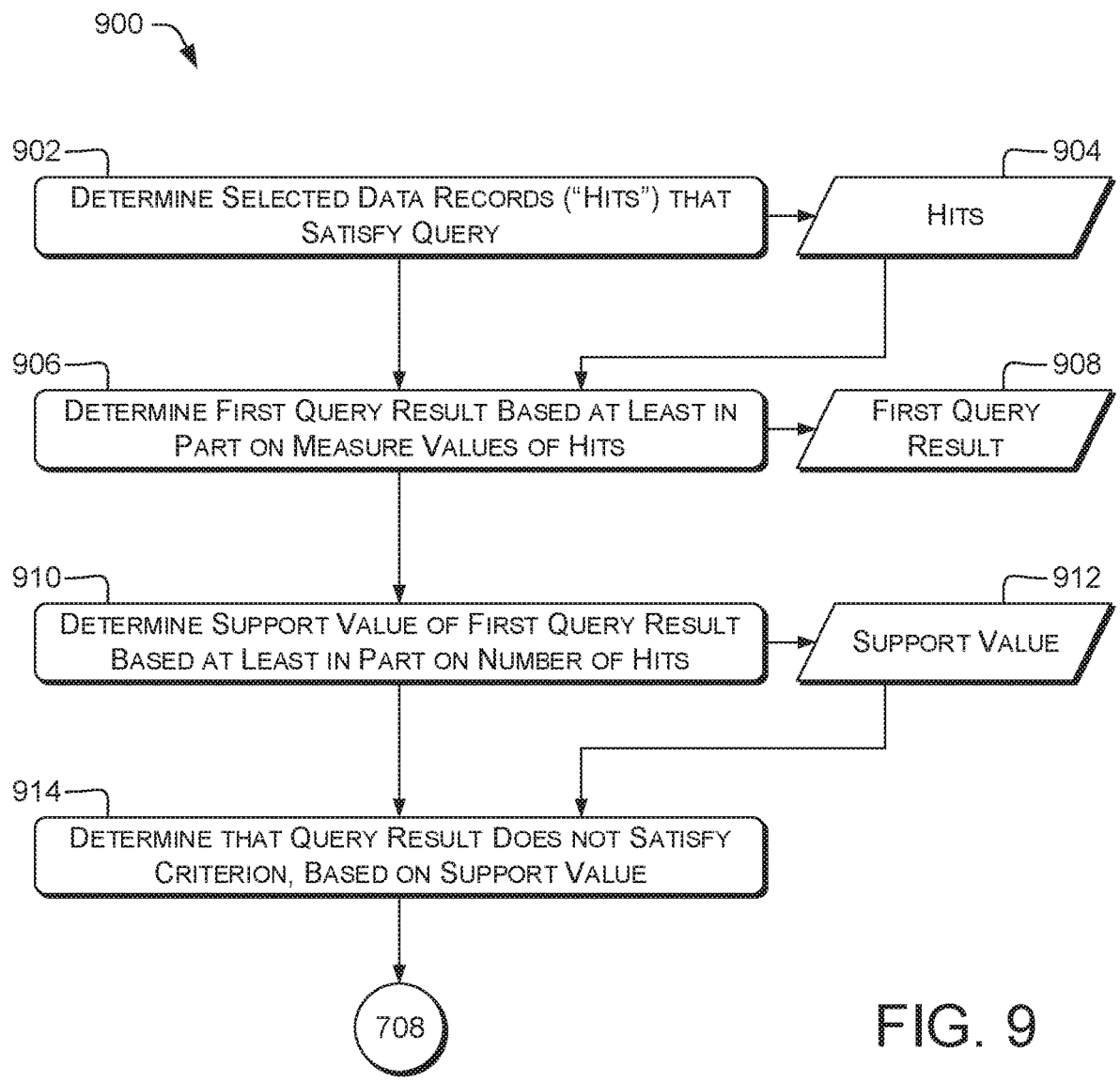
FIG. 9 is a dataflow diagram that illustrates example processes for processing queries, and example data items, according to various examples described herein.

FIG. 9 is a dataflow diagram that illustrates an example process 900 for processing queries, and example data items. Operations of process 900 can be carried out, e.g., by the querying module 230.

In some examples, at block 902, of the first data records 306, selected data records 904, or "hits," can be determined that satisfy the query 322.

In some examples, at block 906, a first query result 908, which can represent first query result 704, can be determined based at least in part on respective measure values of the selected data records 904 (the hits). Examples are discussed above, e.g., with reference to blocks 406 or 604.

In some examples, at block 910, a support value 912 of the first query result 908 can be determined based at least in part on the number of selected data records (hits) 904, e.g., a number of records of the first data records that satisfy the query 322. Examples are discussed above, e.g., with reference to block 606.

In some examples, block 910 can be performed after block 902, or before block 906. For example, aggregation operations can be performed (block 906) only after determining that the first query result 908 satisfies an accuracy criterion, e.g., based on the support value 912 (determined at block 910). This can reduce CPU utilization and reduce query response delay by determining the first query result 908 only if the first query result 908 will meet the criterion.

In some examples, at block 914, which can represent decision block 706, it can be determined that the first query result 908 does not satisfy the predetermined accuracy criterion based at least in part on the support value 912. Block 914 can be followed by block 708. Examples are discussed above, e.g., with reference to decision block 608.

Figure 10:
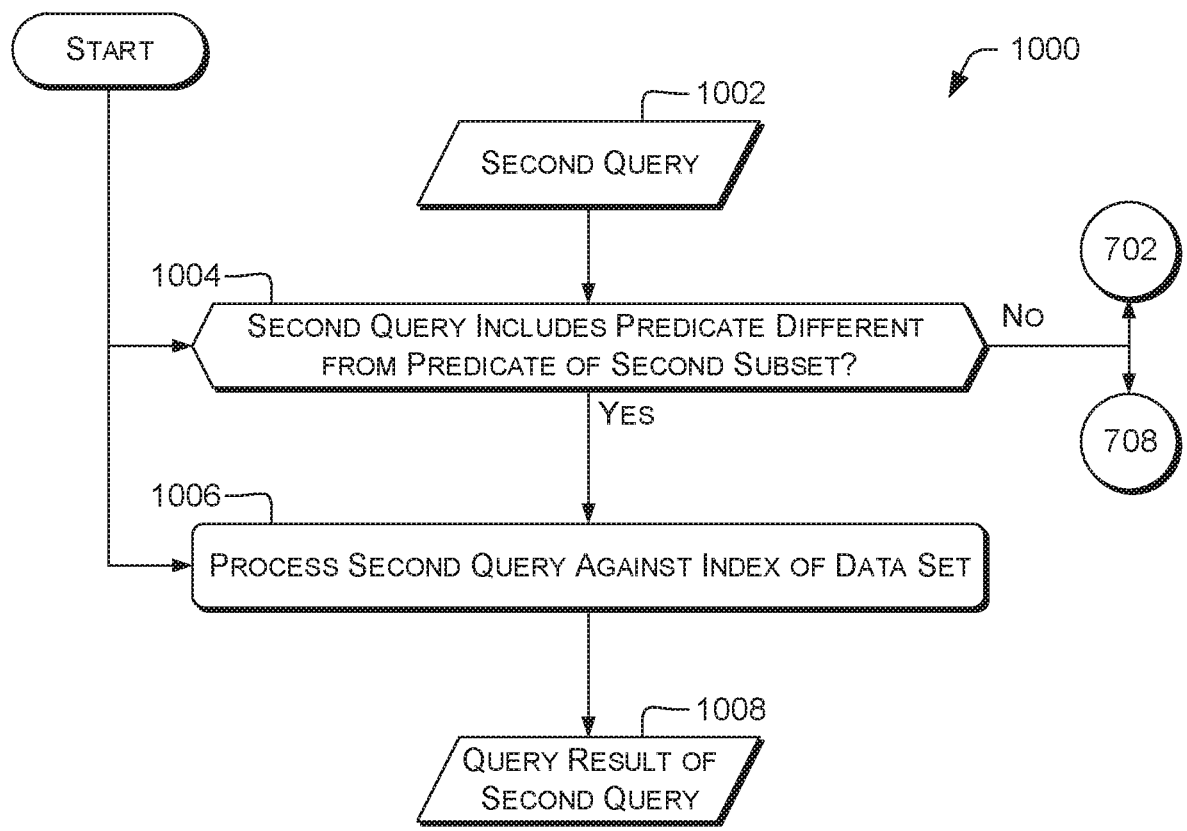
FIG. 10 is a dataflow diagram that illustrates an example process for processing queries, and example data items, according to various examples described herein.

FIG. 10 is a dataflow diagram that illustrates an example process 1000 for processing queries, and example data items. Operations of process 1000 can be carried out, e.g., by the querying module 230. Processing can begin with decision block 1004 or block 1006. In some examples, a second query 1002 can be processed.

In some examples, at decision block 1004, it can be determined whether the second query 1002 includes a predicate different from the predetermined predicate of the second subset. If not, decision block 1004 can be followed by block 702 or block 708. If so, decision block 1004 can be followed by block 1006. This can permit the second query 1002 to be performed against the index 316.

In some examples, at block 1006, the second query 1002 can be processed against an index 316 of the data set to provide a query result 1008 of the second query 1002. The index 316 can include a mapping from a predicate to at least one third data record 306 of the data set associated with the predicate and to at least one respective approximation value associated with the at least one third data record. Examples are discussed above, e.g., with reference to block 404.

Figure 11:
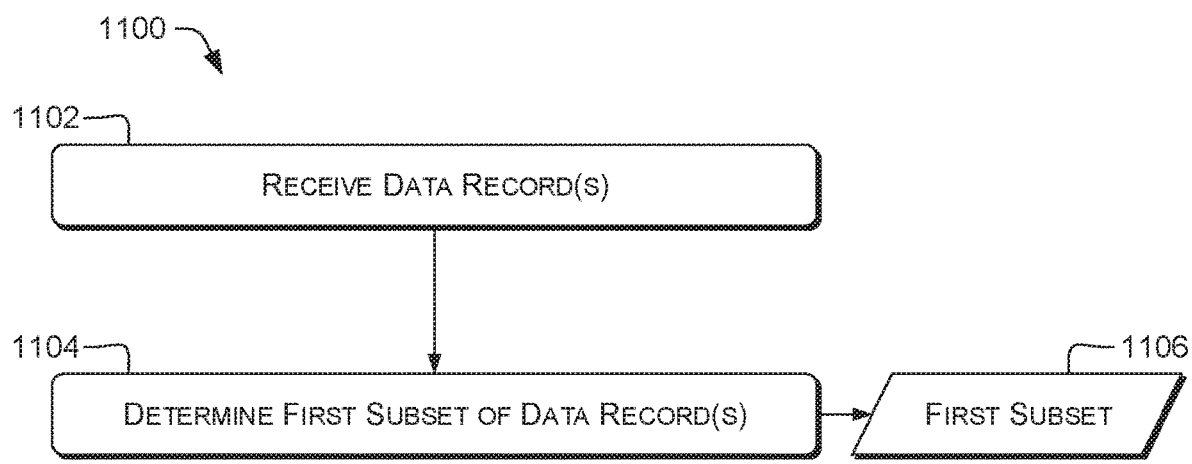
FIG. 11 is a dataflow diagram that illustrates example processes for building databases, and example data items, according to various examples described herein.

FIG. 11 is a dataflow diagram that illustrates an example process 1100 for analyzing data records, and example data items. Operations of process 1100 can be carried out, e.g., by components of group 320. FIG. 3.

In some examples, at block 1102, a plurality of data records 306 (or at least one data record 306) can be received, e.g., via communications interface 238. Examples are discussed above, e.g., with reference to communications interface 238 or reception module 234. In some examples, a first data record of the plurality of data records 306 can include a first discrete value and a first measure value. A second data record of the plurality of data records 306 can include a second discrete value and a second measure value greater than the first measure value.

In some examples, at block 1104, a first subset 1106 of the plurality of data records 306 can be determined. Block 1104 can operate so that the second data record occurs in the first subset 1106 more frequently than does the first data record. For example, the data records 306 can be sampled with probabilities proportional to or correlated with their measure values, e.g., as discussed herein with reference to block 402 or block 614. For example, the second data record could occur once in the first subset 1106 and the first data record could occur no times in the first subset 1106. In another example, the second data record could occur twice in the first subset 1106 and the first data record could occur once in the first subset 1106.

In the example of Table 3, data record 306 #90 (ID=90) has measure values MV1=1 and MV2=8.9793. Data record 306 #91 (ID=91) has measure values MV1=10 and MV2=2.3846. Therefore, data record 306 #91 can occur more frequently in the first subset 1106 than data record 306 #90, if the first measure value is #90.MV1 and the second measure value is #91.MV1 (#91.MV1>#90.MV1). In other examples, data record 306 #90 can occur more frequently in the first subset 1106 than data record 306 #91, if the first measure value is #91.MV2 and the second measure value is #90.MV2 (#90.MV2>#91.MV2).

Figure 12:
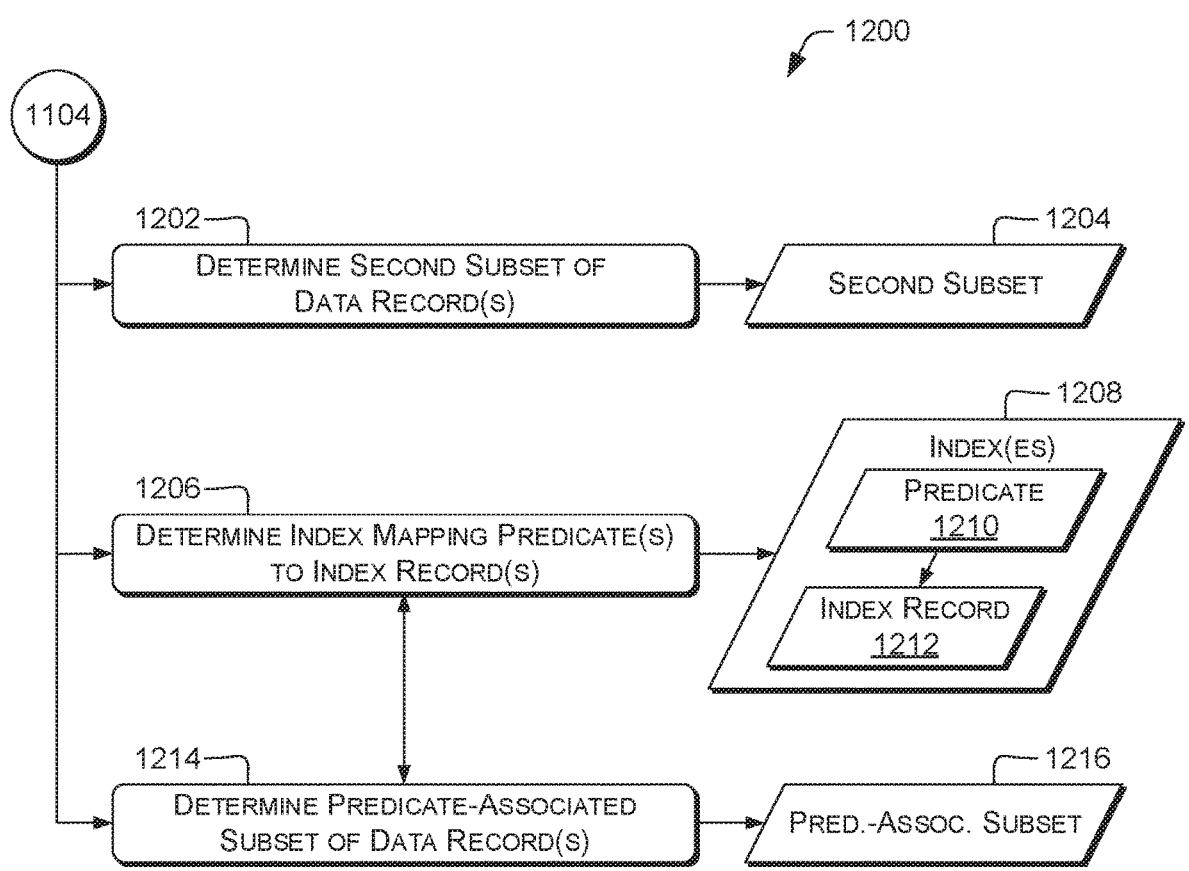
FIG. 12 is a dataflow diagram that illustrates an example process for building databases, and example data items, according to various examples described herein.

FIG. 12 is a dataflow diagram that illustrates an example process 1200 for analyzing data records, and example data items. Operations of process 1200 can be carried out, e.g., by components of group 320, FIG. 3. In some examples, block 1104 can be followed by at least one of blocks 1202, 1206, or 1214.

In some examples, at block 1202, a second subset 1204 of the plurality of data records 306 can be determined. Examples are discussed above, e.g., with reference to sampling module 224 or blocks 402 or 1104. In some examples, the first data record includes a third measure value and the second data record includes a fourth measure value greater than the third measure value. Block 1202 can include determining the second subset 1204 so that the first data record occurs in the first subset more frequently than does the second data record. For example, the second data record could occur no times in the first subset 1106 and the first data record could occur once in the first subset 1106. In another example, the second data record could occur once in the first subset 1106 and the first data record could occur twice in the first subset 1106. In this and other examples, multiple subsets 310 of the data set can be determined. Individual subsets 310. e.g., each and every subset 310, can include or reference data records 306 selected with probability or frequency proportional to the value of a predetermined measure column for the respective subset 310. In the examples of Tables 1, 2, or 3, blocks 402, 1104, or 1202 can include determining two subsets 310: one with probabilities based on MV1, and the other with probabilities based on MV2. For example, the first data record 306 can be #90 and the second data record 306 can be #91. In a first subset 310 based on or associated with MV1, #91 can occur more frequently than #90. However, in a first subset 310 based on or associated with MV2, #90 can occur more frequently than #91. This can permit providing approximate results for aggregate queries on particular measure columns with acceptable accuracy and processing only a relatively small number of rows to answer queries regardless of which measure column is being aggregated.

In some examples, at block 1206, an index 1208, which can represent index 316, can be determined. The index 1208 can include at least one mapping from a predicate 1210 to an index record 1212. In some examples, the predicate 1210 can include at least one of an equality predicate or a range predicate. The index record 1212 can identify at least one of the plurality of data records 306 satisfying the predicate 1210. The index record can include at least one approximation value associated with a measure value of the at least one of the plurality of data records 306. Examples are discussed above, e.g., with reference to indexing module 226, block 404, or Table 2. As described above, the approximation values can be used, e.g., in filtering a data set, e.g., based on a range predicate, or in determining sampling probabilities to increase accuracy compared with uniform sampling schemes.

In some examples, block 1206 can include determining index(es) 1208 including respective index record(s) 1212 associated with each and every value of each and every discrete column in a data set or indexed portion thereof, or with fewer than each and every value, or with fewer than each and every discrete column. Holding index record(s) 1212 associated with each and every value of each and every discrete column in a data set can permit readily answering queries using any combination of predicates. In some examples, block 1206 can be followed by block 1214.

In some examples, at block 1214, a predicate-associated subset 1216, which can represent predicate-associated subset 312, can be determined. The predicate-associated subset 1216 can include half, or fewer than half, of the plurality of data records 306. The predicate-associated subset can comprise data records that satisfy a predetermined predicate. The predetermined predicate can include, e.g., at least one of an equality predicate or a range predicate. In some examples, block 1214 can be followed by block 1206. Using both blocks 1206 and 1214 can permit using both an index 1208 and a predicate-associated subset 1216.

In some examples, any combination of blocks 1202, 1206, or 1214 can be used in any order. This can permit processing queries, e.g., queries 322 or 1002, with the appropriate index to provide rapid query response and acceptable answer accuracy.

Illustrative Results

Continuing the example of Table 1, for the example query 322 "SELECT DV1. SUM(MV1) FROM EXAMPLE GROUP BY DV1", as discussed above with reference to FIG. 3, the exact answer (to two decimal places) can be represented as the answer (0.39, 0.61). In an example of uniform selection according to some prior schemes, selecting 20 rows from Table 1 with uniform probability can provide inaccurate results. For example, if either row #199 or row #200 is included in the sample, but not both, the result can be the distribution (0.15, 0.85). If neither row #199 nor row #200 is included in the sample, the result can be the distribution (0.66, 0.34). Both of these are far from the determined answer. By contrast, as noted above, techniques herein can provide an approximate answer of (0.30, 0.70), much closer to the exact answer than either uniform-selection example.

EXAMPLE CLAUSES

A: A device comprising: a processing unit; and a computer-readable medium including modules configured for execution by the processing unit, the modules comprising: a sampling module configured to determine a first subset of a data set, the first subset comprising first data records selected from the data set based at least in part on respective measure values of the first data records; an indexing module configured to determine an index comprising a mapping from a predicate to one or more second data records of the data set associated with the predicate and to respective approximation values associated with the one or more second data records; and a querying module configured to: process a query against the first subset to provide a first result and a first accuracy value; determine that the first accuracy value does not satisfy a predetermined accuracy criterion; and process the query against the index to provide a second result.

B: A device according to paragraph A, wherein: the sampling module is further configured to determine a predicate-associated subset of the data set including third data records selected from the data set, wherein individual records of the third data records satisfy a predetermined predicate of the predicate-associated subset; and the querying module is further configured to process the query against the predicate-associated subset.

C: A device as recited in paragraph B, wherein the querying module is configured to process the query against the predicate-associated subset in response to the determining that the first accuracy value does not satisfy the predetermined accuracy criterion.

D: A device as recited in paragraph B or C, wherein: the sampling module is further configured to determine a second predicate-associated subset of the data set including fourth data records selected from the data set; individual records of the fourth data records satisfy a predetermined second predicate of the second predicate-associated subset; and the sampling module is configured to determine the predicate-associated subset and the second predicate-associated subset having respective numbers of data records smaller than a predetermined threshold number.

E: A device as recited in any of paragraphs A-D, wherein the mapping comprises respective identifiers of the one or more second data records.

F: A device as recited in any of paragraphs A-E, wherein the querying module is further configured to: determine one or more data records of the first subset, wherein each data record of the one or more data records satisfies the query, and determine the first accuracy value based on a count of the one or more data records.

G: A device as recited in paragraph F, wherein the querying module is further configured to determine the first result based at least in part on the one or more data records.

H: A device as recited in any of paragraphs A-G, wherein the querying module is further configured to: search the index using the query to determine candidate data records of the data set; select a plurality of the candidate data records based at least in part on the respective approximation values to provide selected data records; and determine the second result based at least in part on respective measure values of the selected data records.

I: A device as recited in any of paragraphs A-H, further comprising: a communications interface; and a transmission module configured to transmit, via the communications interface, an indication of the second result.

J: A device as recited in any of paragraphs A-I, wherein the predicate comprises at least one of an equality predicate or a range predicate.

K: A device as recited in any of paragraphs A-J, wherein: the query comprises a range predicate; and the querying module is configured to test at least some of the approximation values of the index against the range predicate.

L: A method, comprising: processing a query against a first subset of a data set to provide a first query result, the first subset comprising first data records selected from the data set based at least in part on respective measure values of the first data records; determining that the first query result does not satisfy a predetermined accuracy criterion; and processing the query against a second subset of the data set to provide a second query result, the second subset comprising second data records selected from the data set, wherein individual records of the second data records satisfy a predetermined predicate of the second subset.

M: A method as recited in paragraph L, further comprising: determining at least one equality/inequality predicate of the query; and determining whether the equality/inequality predicate is associated with the second subset.

N: A method as recited in paragraph M, further comprising determining that the query includes at least one predicate and that each and every predicate in the query is an equality predicate.

O: A method as recited in paragraph M or N, wherein the predicate comprises at least one of an equality predicate or a range predicate.

P: A method as recited in any of paragraphs L-O, further comprising: in response to the determining that the equality/inequality predicate is associated with the second subset, processing the query against the second subset to provide the second query result; and in response to the determining that the equality/inequality predicate is not associated with the second subset, processing the query against an index of the data set to provide a third query result, the index comprising a mapping from a predicate to at least one third data record of the data set associated with the predicate and to at least one respective approximation value associated with the at least one third data record.

Q: A method as recited in paragraph P, further comprising filtering the data set by testing at least some approximation values of the index against a predicate of the query.

R: A method as recited in paragraph Q, wherein the predicate of the query comprises at least one of an equality predicate or a range predicate.

S: A method as recited in any of paragraphs L-R, further comprising: processing a second query against an index of the data set to provide a third query result, the index comprising a mapping from a predicate to at least one third data record of the data set associated with the predicate and to at least one respective approximation value associated with the at least one third data record.

T: A method as recited in paragraph S, further comprising determining that the second query includes a predicate different from the predetermined predicate of the second subset and, in response, processing the second query against the index.

U: A method as recited in any of paragraphs L-T, further comprising: determining, of the first data records, selected data records that satisfy the query; and determining the first query result based at least in part on respective measure values of the selected data records.

V: A method as recited in any of paragraphs L-U, further comprising: determining a support value of the first query result based at least in part on a number of records of the first data records that satisfy the query; and determining that the first query result does not satisfy the predetermined accuracy criterion based at least in part on the support value.

W: A method as recited in any of paragraphs L-V, further comprising: determining, of the second data records, selected data records that satisfy the query; and determining the second query result based at least in part on respective measure values of the selected data records.

X: A method as recited in any of paragraphs L-W, further comprising determining an exact result of the query; and determining a distance metric between the exact result and the second query result.

Y: A method as recited in any of paragraphs L-X, further comprising transmitting an indication of the second query result via a communications interface.

Z: A method as recited in any of paragraphs L-Y, further comprising storing the second data records sequentially in a computer-readable memory.

AA: A method as recited in any of paragraphs L-Z, further comprising: determining one or more predicates of the query; retrieving respective counts of data records associated with the one or more predicates; selecting the predicate associated with the lowest respective count; and processing the query against one of a plurality of predicate-associated subsets associated with the selected predicate, wherein the plurality of predicate-associated subsets includes the second subset.

AB: A computer-readable medium, e.g., a computer storage medium, having thereon computer-executable instructions, the computer-executable instructions upon execution configuring a computer to perform operations as any of paragraphs L-AA recites.

AC: A device comprising: a processor; and a computer-readable medium, e.g., a computer storage medium, having thereon computer-executable instructions, the computer-executable instructions upon execution by the processor configuring the device to perform operations as any of paragraphs L-AA recites.

AD: A system comprising: means for processing; and means for storing having thereon computer-executable instructions, the computer-executable instructions including means to configure the system to carry out a method as any of paragraphs L-AA recites.

AE: A system, comprising: means for processing a query against a first subset of a data set to provide a first query result, the first subset comprising first data records selected from the data set based at least in part on respective measure values of the first data records; means for determining that the first query result does not satisfy a predetermined accuracy criterion; and means for processing the query against a second subset of the data set to provide a second query result, the second subset comprising second data records selected from the data set, wherein individual records of the second data records satisfy a predetermined predicate of the second subset.

AF: A system as recited in paragraph AE, further comprising: means for determining at least one equality/inequality predicate of the query; and means for determining whether the equality/inequality predicate is associated with the second subset.

AG: A system as recited in paragraph AF, further comprising means for determining that the query includes at least one predicate and that each and every predicate in the query is an equality predicate.

AH: A system as recited in paragraph AF or AG, wherein the predicate comprises at least one of an equality predicate or a range predicate.

AI: A system as recited in any of paragraphs AE-AH, further comprising: means for, in response to the determining that the equality/inequality predicate is associated with the second subset, processing the query against the second subset to provide the second query result; and means for, in response to the determining that the equality/inequality predicate is not associated with the second subset, processing the query against an index of the data set to provide a third query result, the index comprising a mapping from a predicate to at least one third data record of the data set associated with the predicate and to at least one respective approximation value associated with the at least one third data record.

AJ: A system as recited in paragraph AI, further comprising means for filtering the data set by testing at least some approximation values of the index against a predicate of the query.

AK: A system as recited in paragraph AJ, wherein the predicate of the query comprises at least one of an equality predicate or a range predicate.

AL: A system as recited in any of paragraphs AE-AK, further comprising: means for processing a second query against an index of the data set to provide a third query result, the index comprising a mapping from a predicate to at least one third data record of the data set associated with the predicate and to at least one respective approximation value associated with the at least one third data record.

AM: A system as recited in paragraph AL, further comprising means for determining that the second query includes a predicate different from the predetermined predicate of the second subset and, in response, processing the second query against the index.

AN: A system as recited in any of paragraphs AE-AM, further comprising: means for determining, of the first data records, selected data records that satisfy the query; and means for determining the first query result based at least in part on respective measure values of the selected data records.

AO: A system as recited in any of paragraphs AE-AN, further comprising: means for determining a support value of the first query result based at least in part on a number of records of the first data records that satisfy the query; and means for determining that the first query result does not satisfy the predetermined accuracy criterion based at least in part on the support value.

AP: A system as recited in any of paragraphs AE-AO, further comprising: means for determining, of the second data records, selected data records that satisfy the query; and means for determining the second query result based at least in part on respective measure values of the selected data records.

AQ: A system as recited in any of paragraphs AE-AP, further comprising: means for determining an exact result of the query; and means for determining a distance metric between the exact result and the second query result.

AR: A system as recited in any of paragraphs AE-AQ, further comprising a communications interface for transmitting an indication of the second query result.

AS: A system as recited in any of paragraphs AE-AR, further comprising a computer-readable memory for sequentially storing the second data records.

AT: A system as recited in any of paragraphs AE-AS, further comprising: means for determining one or more predicates of the query; means for retrieving respective counts of data records associated with the one or more predicates; selecting the predicate associated with the lowest respective count; and means for processing the query against one of a plurality of predicate-associated subsets associated with the selected predicate, wherein the plurality of predicate-associated subsets includes the second subset.

AU: A system, comprising: a communications interface at least one processing unit; and at least one computer-readable medium including instructions to, when executed by the at least one processing unit, cause the at least one processing unit to: receive, via the communications interface, a plurality of data records, wherein a first data record of the plurality of data records includes a first discrete value and a first measure value, and a second data record of the plurality of data records includes a second discrete value and a second measure value greater than the first measure value; determine a first subset of the plurality of data records, wherein the second data record occurs in the first subset more frequently than does the first data record.

AV: A system as recited in paragraph AU, wherein the first data record includes a third measure value and the second data record includes a fourth measure value greater than the third measure value, the instructions further to cause the at least one processor to: determine a second subset of the plurality of data records, wherein the first data record occurs in the first subset more frequently than does the second data record.

AW: A system as recited in paragraph AU or AV, the instructions further to cause the at least one processor to determine an index including at least one mapping from a predicate to an index record, wherein: the index record identifies at least one of the plurality of data records satisfying the predicate; and the index record comprises at least one approximation value associated with a measure value of the at least one of the plurality of data records.

AX: A system as recited in any of paragraphs AU-AW, the instructions further to cause the at least one processor to: determine a predicate-associated subset of fewer than half of the plurality of data records, the predicate-associated subset comprising data records that satisfy a predetermined predicate.

AY: A system as recited in paragraph AX, the instructions further to cause the at least one processor to determine an index including at least one mapping from a predicate to an index record, wherein: the index record identifies at least one of the plurality of data records satisfying the predicate; and the index record comprises at least one approximation value associated with a measure value of the at least one of the plurality of data records.

CONCLUSION

Various query-processing techniques described herein can permit more efficiently analyzing data to provide approximate results. Some examples can provide approximate results in an interactive time scale, e.g., during a session such as a communication session with an entity. Various examples can provide improved consistency of query-result accuracy compared to prior schemes, permitting users to more effectively use the approximate results. Various examples can reduce the time or memory requirements for determining a database while providing an acceptable level of accuracy of approximate results. Various examples can provide a selected level of accuracy of approximate query results with a number of I/O operations (e.g., sequential reads or random seeks) having predetermined limits.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 114, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs. and/or one or more pieces of hardware logic such as FPGAs, DSPs, and/or other types described above.

All of the methods and processes described above can be embodied in, and fully automated via, software code modules executed by one or more computers and/or processors. The code modules can be embodied in any type of computer-readable medium. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "at least X, Y, or Z," or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. Examples herein are nonlimiting unless expressly stated otherwise, regardless of whether or not they are explicitly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A device comprising:
 a processing unit; and
 a computer-storage medium including instructions configured for execution by the processing unit that cause the processing unit to execute a method, the method comprising:
   executing a sampling module, wherein the sampling module determines a first subset of a data set, the first subset comprising first data records selected from the data set based at least in part on respective measure values of the first data records, wherein the measure value is a value, provided in a field in each data record, which is added to other measure values in the first subset, and wherein a probability of each of the first data records being selected is proportional to a quotient of the measure value of each of the first data records divided by a sum of the measure values for the first data records;
   executing an indexing module, wherein the indexing module determines an index comprising a mapping from a predicate to one or more second data records of the data set associated with the predicate and to respective approximation values associated with the one or more second data records; and executing a querying module, wherein the querying module:
processes a query against the first subset to provide a first result and a first accuracy value;
determine one or more data records of the first subset, wherein each data record of the one or more data records satisfies the query;
determine the first accuracy value based on a count of the one or more data records;
determines that the first accuracy value does not satisfy a predetermined accuracy criterion; and
processes the query against the index to provide a second result.

2. A device according to claim 1, wherein:
the sampling module is further configured to determine a predicate-associated subset of the data set including third data records selected from the data set, wherein individual records of the third data records satisfy a predetermined predicate of the predicate-associated subset; and
the querying module is further configured to process the query against the predicate-associated subset.

3. A device as recited in claim 2, wherein the querying module is configured to process the query against the predicate-associated subset in response to the determining that the first accuracy value does not satisfy the predetermined accuracy criterion.

4. A device as recited in claim 2, wherein:
the sampling module is further configured to determine a second predicate-associated subset of the data set including fourth data records selected from the data set;
individual records of the fourth data records satisfy a predetermined second predicate of the second predicate-associated subset; and
the sampling module is configured to determine the predicate-associated subset and the second predicate-associated subset having respective numbers of data records smaller than a predetermined threshold number.

5. A device as recited in claim 1, wherein the mapping comprises respective identifiers of the one or more second data records.

6. A device as recited in claim 1, wherein the querying module is further configured to determine the first result based at least in part on the one or more data records.

7. A device as recited in claim 1, wherein the querying module is further configured to:
search the index using the query to determine candidate data records of the data set;
select a plurality of the candidate data records based at least in part on the respective approximation values to provide selected data records; and
determine the second result based at least in part on respective measure values of the selected data records.

8. A method, comprising:
processing a query against a first subset of a data set to provide a first query result, wherein the first subset comprises first data records, wherein each data record of the first data records satisfies the query, wherein first data records are selected from the data set based at least in part on respective measure values of the first data records, wherein the measure value is a value, provided in a field in each data record, which is added to other measure values in the first subset, and wherein a probability of the each of the first data records being selected is proportional to a quotient of the measure value of each of the first data records divided by a sum of the measure values for the first data records;
determining that the first query result does not satisfy a predetermined accuracy criterion, wherein the predetermined accuracy criterion is based on a count of the one or more data records and is a Euclidean distance between the first subset and the first data records; and
processing the query against a second subset of the data set to provide a second query result, the second subset comprising second data records selected from the data set, wherein individual records of the second data records satisfy a predetermined predicate of the second subset.

9. A method as recited in claim 8, further comprising:
determining at least one predicate of the query; and
determining whether the predicate is associated with the second subset.

10. A method as recited in claim 8, further comprising:
in response to the determining that the predicate is associated with the second subset, processing the query against the second subset to provide the second query result; and
in response to the determining that the predicate is not associated with the second subset, processing the query against an index of the data set to provide a third query result, the index comprising a mapping from a predicate to at least one third data record of the data set associated with the predicate and to at least one respective approximation value associated with the at least one third data record.

11. A method as recited in claim 8, further comprising:
processing a second query against an index of the data set to provide a third query result, the index comprising a mapping from a predicate to at least one third data record of the data set associated with the predicate and to at least one respective approximation value associated with the at least one third data record.

12. A method as recited in claim 11, further comprising determining that the second query includes a predicate different from the predetermined predicate of the second subset and, in response, processing the second query against the index.

13. A method as recited in claim 8, further comprising:
determining, of the first data records, selected data records that satisfy the query; and
determining the first query result based at least in part on respective measure values of the selected data records.

14. A method as recited in claim 8, further comprising:
determining a support value of the first query result based at least in part on a number of records of the first data records that satisfy the query; and
determining that the first query result does not satisfy the predetermined accuracy criterion based at least in part on the support value.

15. A system, comprising:
a communications interface;
at least one processing unit; and
at least one computer-storage medium including instructions to, when executed by the at least one processing unit, cause the at least one processing unit to:
in response to a query, receive, via the communications interface, a plurality of data records wherein each data record of the one or more data records satisfies the query, wherein a first data record of the plurality of data records includes a first discrete value and a first measure value, which is provided in a first field in the first data record, and a second data record of the plurality of data records includes a second discrete value and a second measure value, which is provided in a second field in the second data record, and which is greater than the first measure value, wherein the first measure value is a first value added to at least the second measure value, wherein a first probability of the first data record being selected is proportional to a first quotient of the first measure value of the first data record divided by a sum of the measure values for the data records, and wherein a second probability of the second data record being selected is proportional to a second quotient of the second measure value of the second data record divided by the sum of the measure values for the data records;
determine a first subset of the plurality of data records, wherein the second data record occurs in the first subset more frequently than does the first data record.

16. A system as recited in claim 15, wherein the first data record includes a third measure value and the second data record includes a fourth measure value greater than the third measure value, the instructions further to cause the at least one processing unit to:
determine a second subset of the plurality of data records, wherein the first data record occurs in the first subset more frequently than does the second data record.

17. A system as recited in claim 15, the instructions further to cause the at least one processing unit to determine an index including at least one mapping from a predicate to an index record, wherein:
the index record identifies at least one of the plurality of data records satisfying the predicate; and
the index record comprises at least one approximation value associated with a measure value of the at least one of the plurality of data records.

18. A system as recited in claim 15, the instructions further to cause the at least one processing unit to:
determine a predicate-associated subset of fewer than half of the plurality of data records, the predicate-associated subset comprising data records that satisfy a predetermined predicate.

19. A system as recited in claim 18, the instructions further to cause the at least one processing unit to determine an index including at least one mapping from a predicate to an index record, wherein:
the index record identifies at least one of the plurality of data records satisfying the predicate; and
the index record comprises at least one approximation value associated with a measure value of the at least one of the plurality of data records.

* * * * *